US012459884B2

(12) United States Patent
Suzuki et al.

(10) Patent No.: US 12,459,884 B2
(45) Date of Patent: Nov. 4, 2025

(54) METHOD FOR PRODUCING CARBONATE ESTERS, AND CATALYTIC STRUCTURE FOR PRODUCING CARBONATE ESTERS

(71) Applicants: NIPPON STEEL CORPORATION, Tokyo (JP); MITSUBISHI GAS CHEMICAL COMPANY, INC., Tokyo (JP); NIPPON STEEL ENGINEERING CO., LTD., Tokyo (JP)

(72) Inventors: Kimihito Suzuki, Tokyo (JP); Yousuke Shinkai, Tokyo (JP); Hongyu Liu, Tokyo (JP); Hidefumi Harada, Tokyo (JP); Yuzuru Kato, Tokyo (JP); Kentaro Morita, Tokyo (JP); Asuka Ohashi, Tokyo (JP)

(73) Assignees: NIPPON STEEL CORPORATION, Tokyo (JP); MITSUBISHI GAS CHEMICAL COMPANY, INC., Tokyo (JP); NIPPON STEEL ENGINEERING CO., LTD., Tokyo (JP)

( * ) Notice: Subject to any disclaimer, the term of this patent is extended or adjusted under 35 U.S.C. 154(b) by 1272 days.

(21) Appl. No.: 17/257,730

(22) PCT Filed: Jul. 8, 2019

(86) PCT No.: PCT/JP2019/027020
§ 371 (c)(1),
(2) Date: Jan. 4, 2021

(87) PCT Pub. No.: WO2020/013135
PCT Pub. Date: Jan. 16, 2020

(65) Prior Publication Data
US 2021/0284594 A1 Sep. 16, 2021

(30) Foreign Application Priority Data
Jul. 10, 2018 (JP) .................................. 2018-130710

(51) Int. Cl.
*B01J 21/08* (2006.01)
*B01J 23/10* (2006.01)
*B01J 35/56* (2024.01)
*C07C 68/04* (2006.01)

(52) U.S. Cl.
CPC ............... *C07C 68/04* (2013.01); *B01J 21/08* (2013.01); *B01J 23/10* (2013.01)

(58) Field of Classification Search
CPC ............ C07C 68/04; B01J 21/08; B01J 23/10
See application file for complete search history.

(56) References Cited

U.S. PATENT DOCUMENTS

| 6,475,949 | B1 | 11/2002 | Yamaguchi et al. | |
|---|---|---|---|---|
| 9,522,360 | B2 | 12/2016 | Schmidt et al. | |
| 10,441,943 | B2 | 10/2019 | Sato et al. | |
| 10,584,092 | B2* | 3/2020 | Shinkai | C07D 213/84 |
| 10,793,524 | B2* | 10/2020 | Harada | B01J 37/08 |
| 11,161,816 | B2* | 11/2021 | Harada | B01J 23/04 |
| 11,596,936 | B2* | 3/2023 | Harada | B01J 23/10 |
| 11,970,442 | B2* | 4/2024 | Harada | C07C 68/04 |
| 12,129,230 | B2* | 10/2024 | Liu | B01J 23/10 |
| 12,202,786 | B2* | 1/2025 | Harada | B01J 23/10 |
| 2004/0192546 | A1 | 9/2004 | Dang et al. | |
| 2005/0011369 | A1 | 1/2005 | Payen | |
| 2006/0172885 | A1 | 8/2006 | Shimazu et al. | |
| 2012/0071687 | A1 | 3/2012 | Herzog et al. | |
| 2013/0289305 | A1 | 10/2013 | Herzog et al. | |
| 2017/0304814 | A1 | 10/2017 | Homma et al. | |
| 2017/0341060 | A1 | 11/2017 | Sato et al. | |
| 2018/0078924 | A1* | 3/2018 | Mori | B01J 37/02 |
| 2019/0382345 | A1 | 12/2019 | Harada et al. | |

(Continued)

FOREIGN PATENT DOCUMENTS

JP 6-145113 A 5/1994
JP 2000-176283 A 6/2000
(Continued)

OTHER PUBLICATIONS

E. Leino, et al. 210, Catalysis Today 47-54 (2013) (Year: 2013).*
(Continued)

Primary Examiner — Alexander R Pagano
Assistant Examiner — Frank S. Hou
(74) Attorney, Agent, or Firm — GREENBLUM & BERNSTEIN, P.L.C.

(57) ABSTRACT

Provided are a method for producing carbonate esters, and a catalytic structure for producing carbonate esters, whereby solid catalyst powder formation and detachment are suppressed and superior carbonate ester reaction efficiency is yielded when a catalytic structure constituted by a sufficient quantity of a cerium-oxide-containing solid catalyst supported on a substrate is used. The method for producing carbonate esters includes reacting a monohydric alcohol and carbon dioxide in the presence of a catalytic structure and a hydrating agent. The catalytic structure includes a substrate and a catalytic layer that is formed on at least a portion of the surface of the substrate and contains a solid catalyst and an inorganic binder. The solid catalyst contains cerium oxide. The supported quantity of the solid catalyst is 15 g/m$^2$ to 200 g/m$^2$, inclusive. The inorganic binder contains silica and/or alumina.

10 Claims, 6 Drawing Sheets

(56) References Cited

U.S. PATENT DOCUMENTS

| | | | |
|---|---|---|---|
| 2020/0392085 A1 | 12/2020 | Harada et al. | |
| 2021/0061749 A1* | 3/2021 | Harada | C07C 69/96 |
| 2022/0009873 A1* | 1/2022 | Liu | B01J 23/10 |
| 2023/0348367 A1* | 11/2023 | Harada | B01J 23/10 |
| 2024/0400495 A1* | 12/2024 | Suzuki | B01J 21/08 |

FOREIGN PATENT DOCUMENTS

| | | | |
|---|---|---|---|
| JP | 2012162523 A * | 8/2012 | |
| JP | 2013-646 A | 1/2013 | |
| JP | 2016-17004 A | 2/2016 | |
| JP | 2016-59901 A | 4/2016 | |
| JP | 2016-104477 A | 6/2016 | |
| JP | 2016-190226 A | 11/2016 | |
| RU | 2 606 623 C2 | 1/2017 | |
| WO | 2016/093329 A1 | 6/2016 | |
| WO | 2018/116775 A1 | 6/2018 | |

OTHER PUBLICATIONS

M. Honda, et al. 318 Journal of catalysis 95-107 (2014) (Year: 2014).*

D. Zhao, et al. 279 science 548-552 (1998) (Year: 1998).*

B. Terence, The Properties and Uses of Silicon Metal, 2019 (Year: 2019).*

E. Leino, Transformation of carbon dioxide to diethyl carbonate over ceria and ceria-supported catalysts (2015) (Year: 2015).*

H, Xu, et al. 28.5 Journal of Rare Earths 721-726 (2010)("Xu") (Year: 2010).*

S. Zhu, et al., 25 Journal of Rare Earths 457-461 (2007)("Zhu") (Year: 2007).*

G. Liu, et al., 8 Chinese Journal of Chemical Engineering (2014) 875-881 ("Liu") (Year: 2014).*

G. Silveira, et al, 369 Journal of colloid and interface science, 302-308 (2012) (Year: 2012).*

Singapore Search Report and Written Opinion issued in the corresponding Singapore Patent Application No. 11202012740P dated Sep. 24, 2021.

Extended European Search Report to the corresponding European Patent Application No. 19833012.8, dated Sep. 15, 2021.

Honda et al. "Organic carbonate synthesis from $CO_2$ and alcohol over $CeO_2$ with 2-cyanopyridine: Scope and mechanistic studies" Journal of Catalysis 318 (2014) 95-107.

Dragos Stoian et al, "Improving the Stability of CeO2 Catalyst by Rare Earth Metal Promotion and Molecular Insights in the Dimethyl Carbonate Synthesis from CO2 and Methanol with 2-Cyanopyridine", ACS Catalysis, vol. 8, issue4, Mar. 5, 2018,3181-3193.

Stoian, D. et al., "Catalysis under microscope: Unraveling the mechanism of catalyst de- and re-activation in the continuous dimethyl carbonate synthesis from CO2 and methanol in the presence of a dehydrating agent", Catalysis Today, vol. 283, 2016, pp. 2-10.

Nakagawa, Y. et al., "Synthesis of dimethyl carbonate from carbon dioxide and methanol by means of ceria catalyst in which nitrile is used as dehydrating-agent", Proceedings of the forum A of 110th, Catalysis Society of Japan Meeting, pp. 145-146 (Cited in ISR).

International Search Report issued in International Patent Application No. PCT/JP2019/027020, dated Sep. 17, 2019, along with English Translation thereof.

Written Opinion of the International Searching Authority issued in International Patent Application No. PCT/JP2019/027020, dated Sep. 17, 2019, along with English Translation thereof.

Office Action issued in Koren Patent Application No. 10-2021-7002505, issued Mar. 3, 2024, translation.

* cited by examiner

[Figure 1]
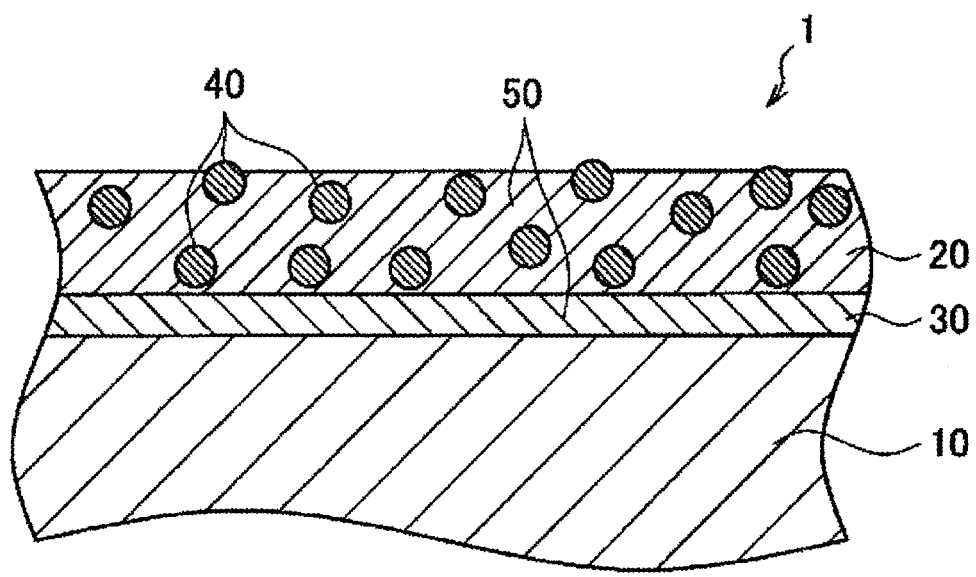
[Figure 2]
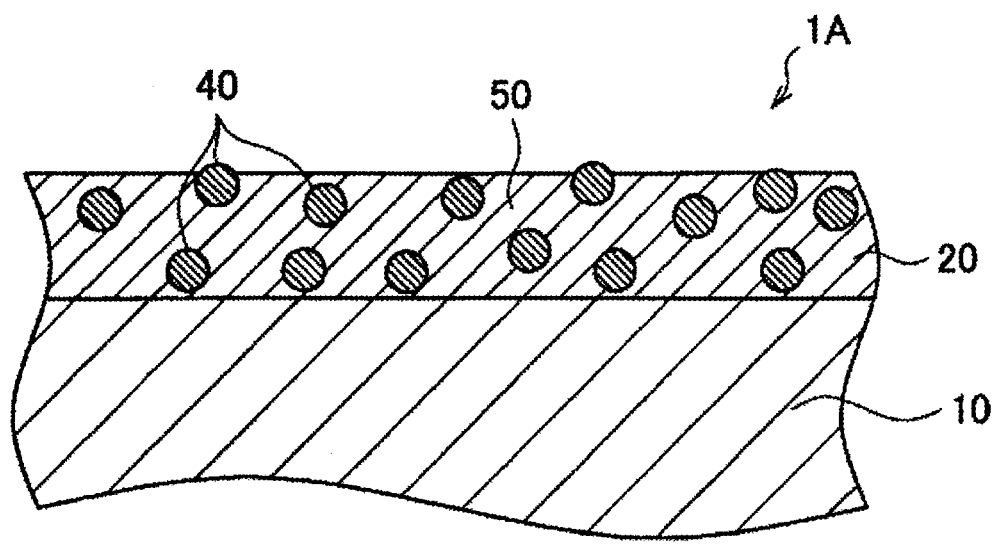

[Figure 3]
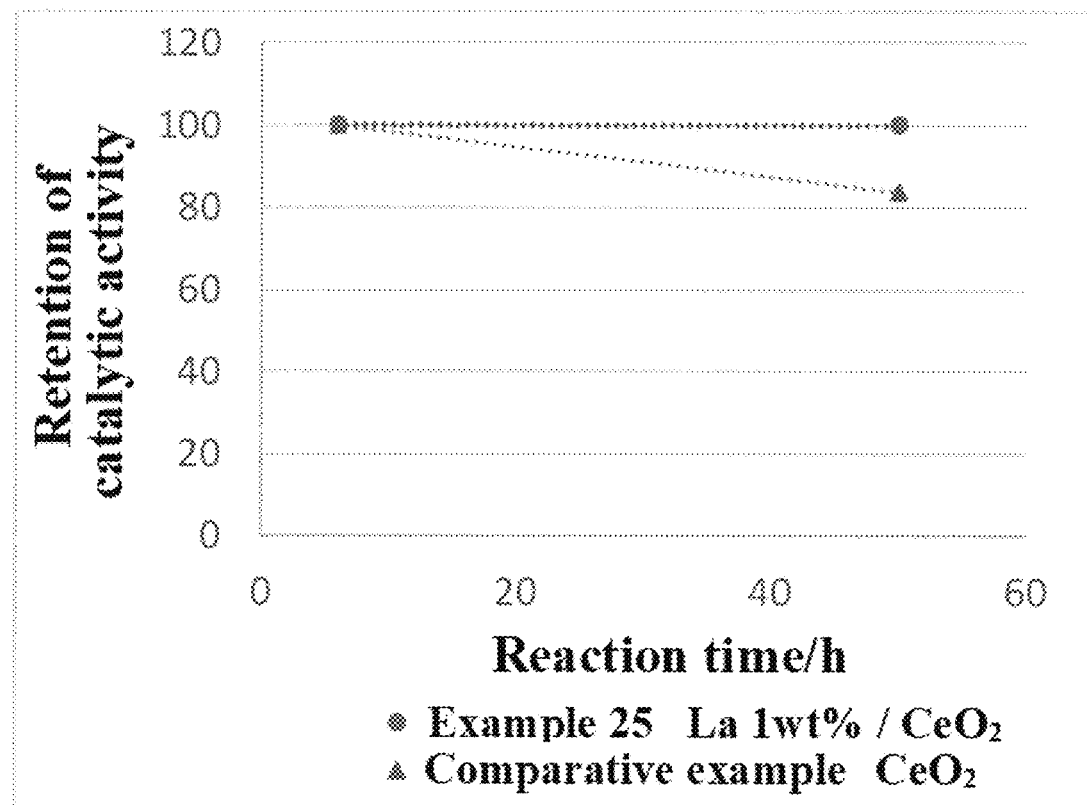

[Figure 4]
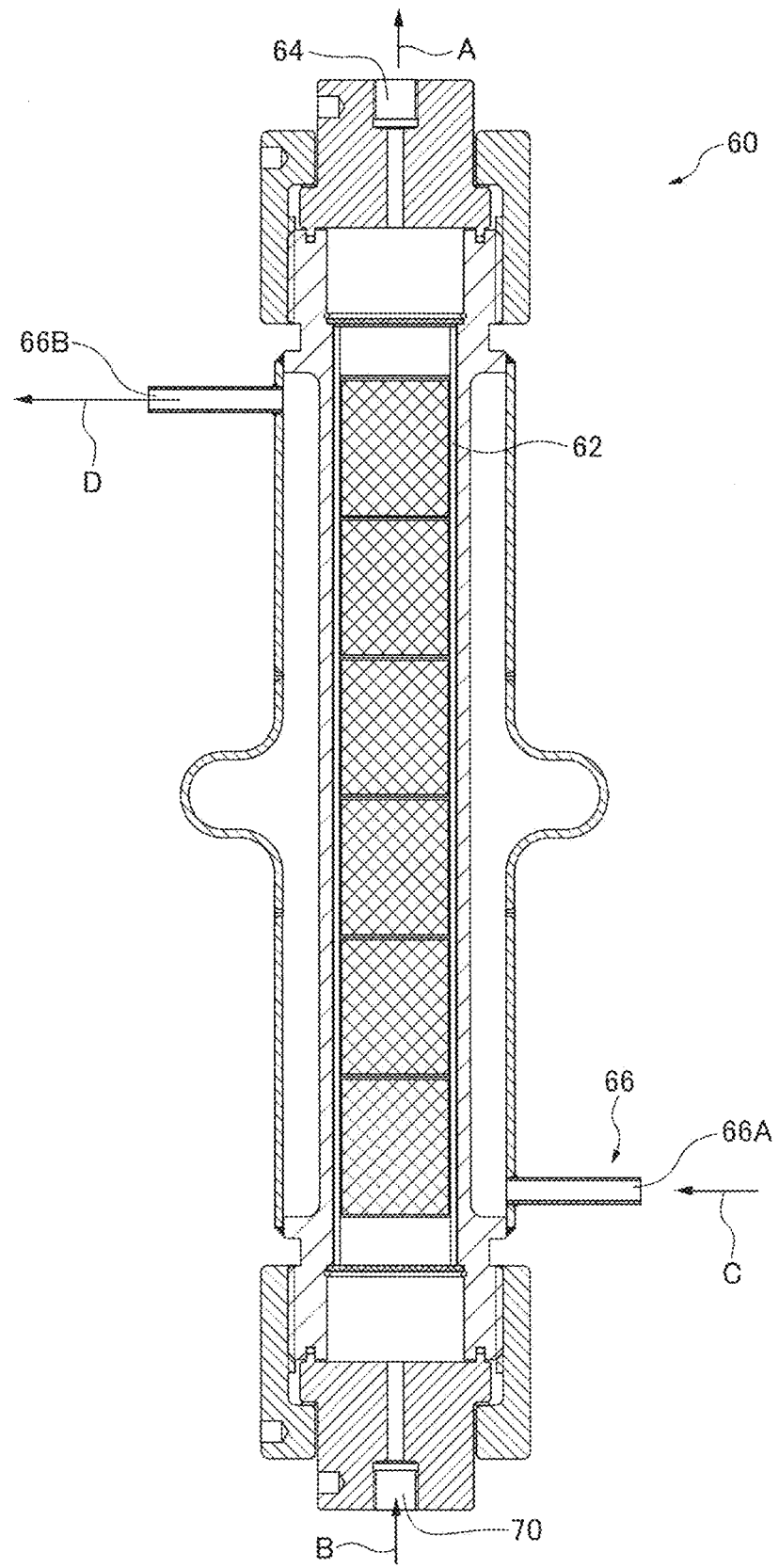

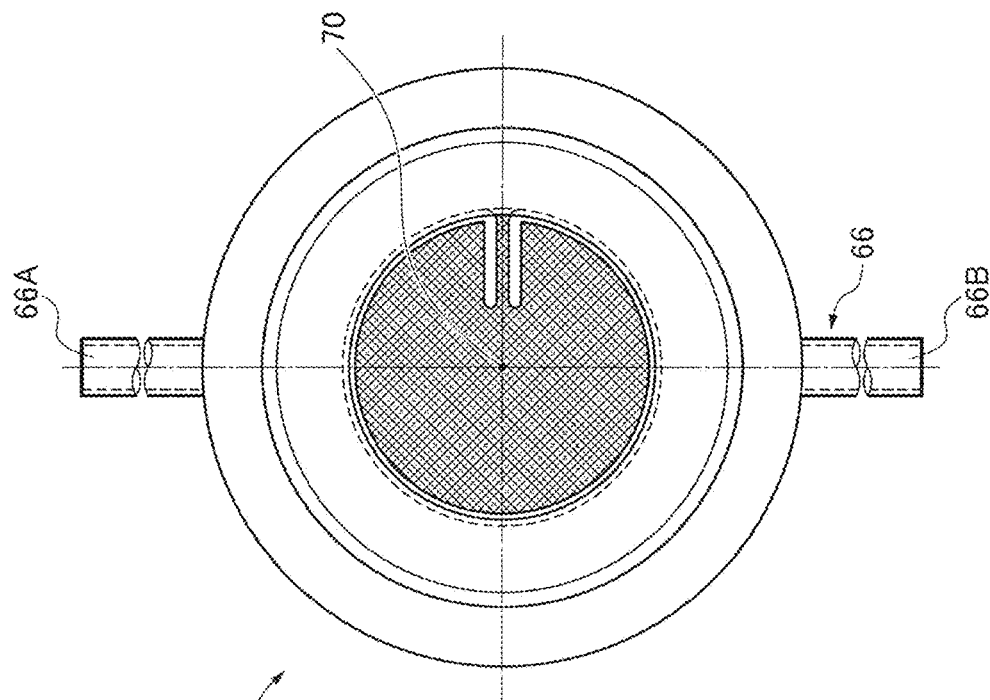
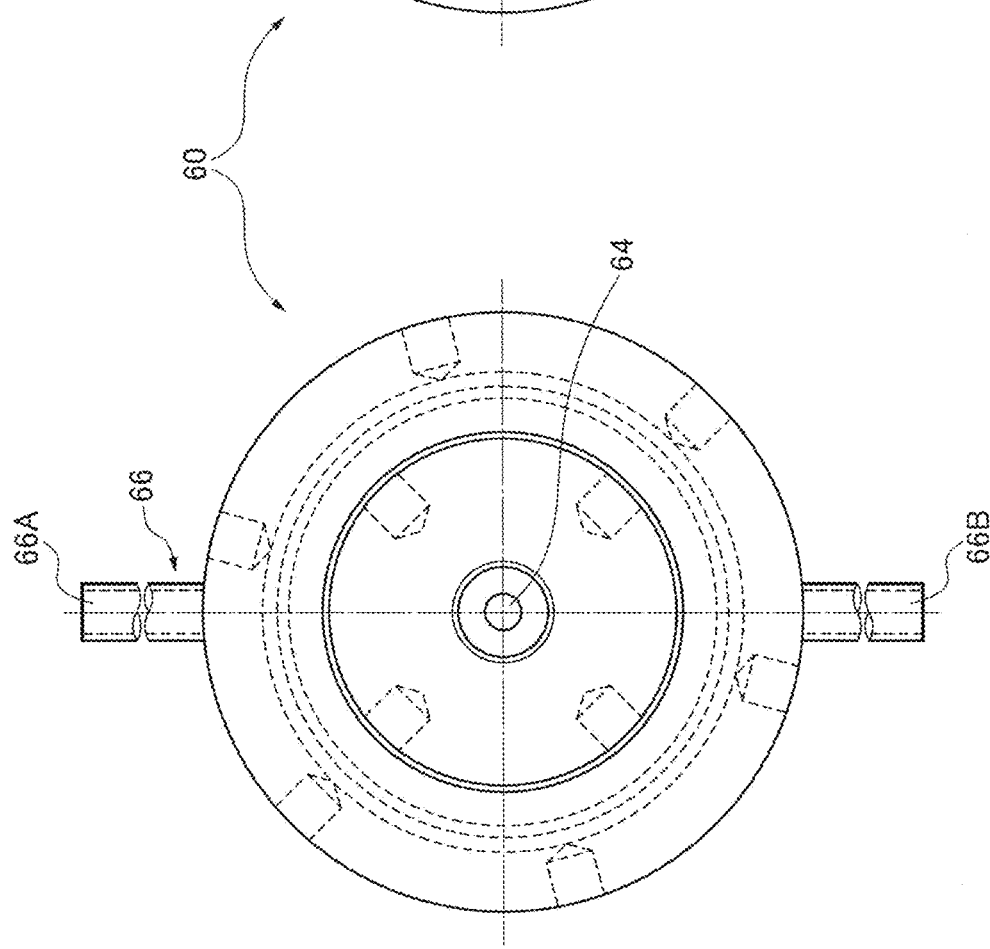
[Figure 5]

[Figure 6]
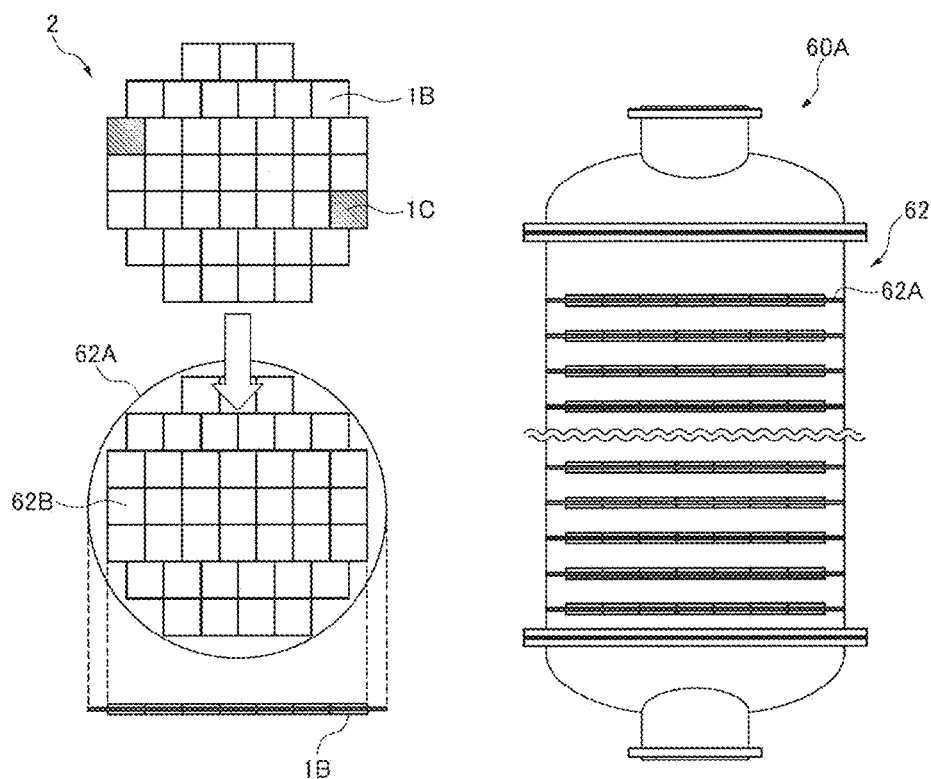
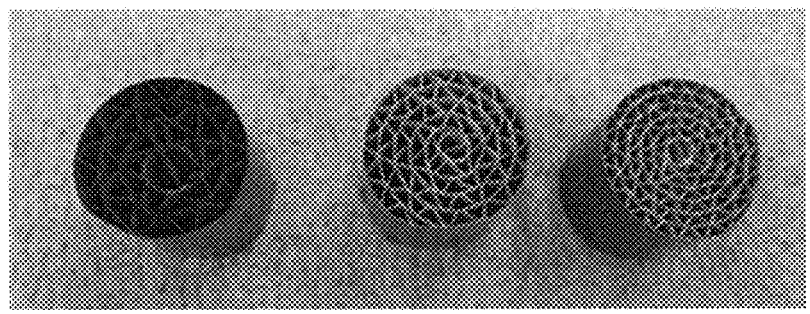
[Figure 7] (A)
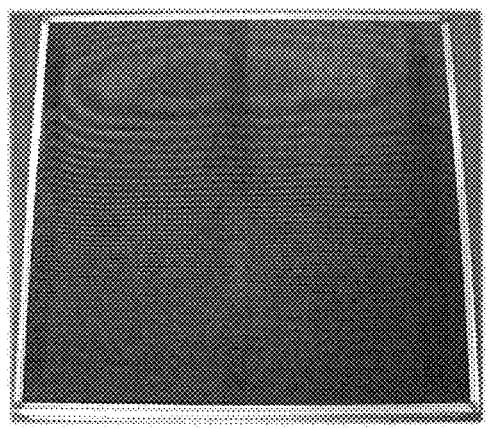
[Figure 7] (B)

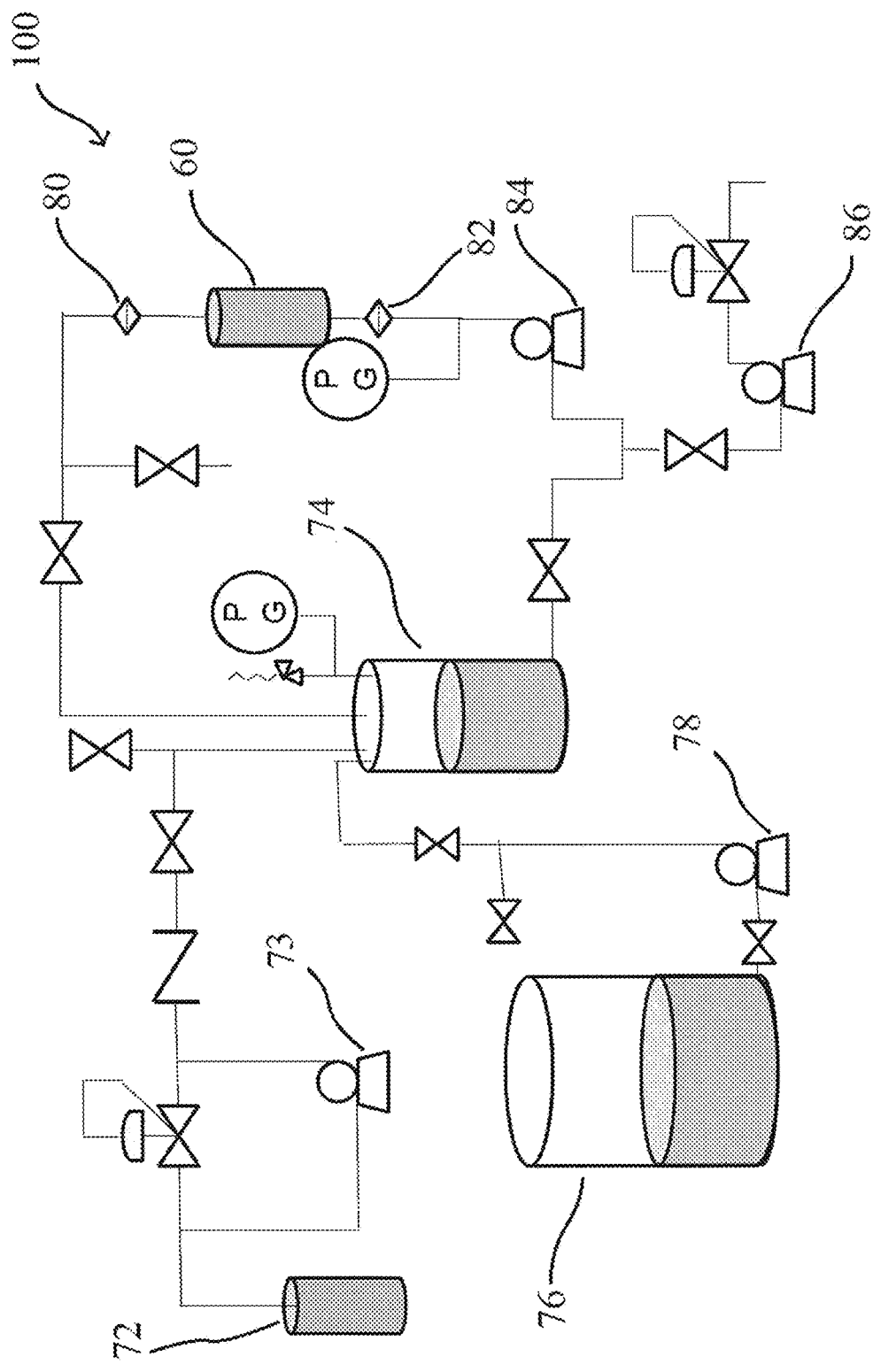
[Figure 8]

METHOD FOR PRODUCING CARBONATE ESTERS, AND CATALYTIC STRUCTURE FOR PRODUCING CARBONATE ESTERS

TECHNICAL FIELD

The present invention relates to a method for producing a carbonate ester and a catalytic structure for producing a carbonate ester.

BACKGROUND ART

Global warming concerns are rising these days. The COP (Conference of the Parties) for discussing international frameworks such as the reduction of greenhouse gas emissions sets the long-term global goals of sufficiently staying below an average temperature increase of 2° C. above pre-industrial levels and reaching the peak of emissions as soon as possible to drastically reduce emissions based on the latest scientific knowledge. While the Paris Agreement reached at COP21 requires all nations strive to formulate and communicate long-term low greenhouse gas emission development strategies, our country formulated 80% greenhouse gas emissions reduction by 2050 as a long-term goal. Carbon dioxide is estimated to have the largest influence above all of the man-made greenhouse gas emissions, and thus parties concerned are working strenuously to develop technological countermeasures for reducing carbon dioxide. While some attempts have been proposed to convert emitted carbon dioxide into a useful substance as a technological countermeasure, a large amount of energy is required to convert carbon dioxide into another substance and thus development of an effective catalyst for accelerating the reaction has been desired. In addition, the useful substance has to be a highly demanded substance so that it can be adapted to a technique that contributes to carbon dioxide reduction.

Meanwhile, carbonate esters are very useful compounds that can be used as additives such as a gasoline additive for improving the octane number, a diesel fuel additive for reducing the amount of particles in exhaust gas, and also as an alkylation agent, a carbonylation agent, a solvent or the like used for synthesizing a resin or an organic compound such as polycarbonate, urethane, a pharmaceutical, an agrochemical or as an electrolyte for lithium batteries, a raw material for a lubricant or a raw material for an oxygen absorber for preventing rust on boiler pipes.

A carbonate ester is a generic name of a compound obtained by substituting one or two of the two hydrogen atoms in carbonic acid, $CO(OH)_2$, with an alkyl group or an aryl group, and has a structure of RO—C(=O)—OR' (where R and R' each represent a saturated hydrocarbon group or an unsaturated hydrocarbon group). Therefore, if such a compound can efficiently be generated from carbon dioxide, which is a compound equivalent to carbonic acid, it can contribute to a useful measure for reducing carbon dioxide.

When a carbonate ester is directly synthesized from carbon dioxide and a liquid alcohol, the reaction is known to proceed acceleratingly in the presence of a solid catalyst such as cerium oxide ($CeO_2$) powder or zinc oxide ($ZrO_2$) powder and a nitrile compound as a hydration agent together. In particular, when cerium oxide powder is used as the solid catalyst, the reaction is known to proceed more rapidly (for example, see Patent document 1).

Some known examples that use a catalyst in a solution reaction system by affixing the catalyst to a catalyst-supporting structure aim at increasing the supplying rate of the raw material solution or aim at preventing elution of the catalyst into the raw material (for example, see Patent documents 2-5). These examples employ techniques such as plating, spraying, vapor deposition or application of coating liquid for affixing the catalyst to the catalyst-supporting structure.

PRIOR ART DOCUMENT

Patent Document

Patent document 1: Japanese Unexamined Patent Application Publication No. 2012-162523
Patent document 2: Japanese Unexamined Patent Application Publication No. H6-145113
Patent document 3: International Patent Application Publication WO2016/093329
Patent document 4: Japanese Unexamined Patent Application Publication No. 2013-646
Patent document 5: Japanese Unexamined Patent Application Publication No. 2016-59901

SUMMARY OF THE INVENTION

Problems to be Solved by the Invention

When the present inventors examined these techniques, however, the present inventors were confronted with the problem of cerium oxide powder being vulnerable to pulverization during the reaction. Since cerium oxide powder directly used in the reaction is pulverized due to fracture caused by contact between the powder or between the powder and the wall of the reactor, it is difficult to separate the powder from the product like a carbonate ester. Furthermore, if cerium oxide powder is directly filled into the reactor, the fluid of the reaction substrate causes flow distortion in the reaction vessel, which renders earning high reaction efficiency difficult upon reaction at a flow rate as high as the flow rate required for an industrial process.

Accordingly, in order to prevent pulverization of cerium oxide powder during the reaction, the present inventors examined use of a catalytic structure in which a catalyst containing cerium oxide is affixed to a base material (catalyst-supporting structure) such as a honeycomb in the reaction system. According to the methods disclosed in Patent documents 2-5, the catalyst was affixed to the base material to a thickness of about 5-10 µm at best.

In addition, when cerium oxide powder was supported by a base material by the methods disclosed in Patent documents 2-5, further improvement of the reaction efficiency was found to be difficult because the amount of the catalyst affixed per unit area of the base material surface determined the rate of the reaction. In addition, if the base material supports a large amount of catalyst, the catalyst may fall off or may be separated from the base material.

Hence, the present invention was made in view of the above-described problems and has an objective of providing a method for producing a carbonate ester, which, when a catalytic structure having a sufficient amount of the cerium oxide-containing solid catalyst supported on a base material is used, can suppress pulverization and separation of the solid catalyst and which can provide highly efficient reaction for producing a carbonate ester for a long period of time. In addition, the present invention also has an objective of providing a catalytic structure for producing a carbonate ester, which can be subjected to a regeneration treatment such as a heat treatment or the like to restore its function even if the catalytic activity is deteriorated after a long period of reaction time, and therefore it can easily be used continuously for a long period of time.

Means for Solving the Problems

In the course of extensive studies for solving the above-described problems, the present inventors studied methods for affixing a solid catalyst to a base material and found that a relatively large amount of solid catalyst can be affixed to the base material relatively tight when the solid catalyst was affixed to the base material together with an inorganic binder containing alumina and/or silica. They also found that activity of the solid catalyst was sufficiently maintained when such an inorganic binder was used for affixing the solid catalyst. As a result of further studies based on such findings, the present inventors accomplished the present invention.

The gist of the present invention is as follows.
(1) A method for producing a carbonate ester, comprising a step of allowing a monohydric alcohol and carbon dioxide to react with each other in the presence of a catalytic structure and a hydration agent to produce a carbonate ester, wherein:
the catalytic structure comprises a base material, and a catalytic layer which is formed on at least a part of the surface of the base material and which contains a solid catalyst and an inorganic binder;
the solid catalyst contains cerium oxide;
the amount of the supported solid catalyst is 15 g/m² to 200 g/m²; and
the inorganic binder contains silica and/or alumina.
(2) The method for producing a carbonate ester according to (1), wherein the inorganic binder contains silica.
(3) The method for producing a carbonate ester according to either one of (1) and (2), wherein the catalytic structure further comprises an intermediate layer consisting of the inorganic binder, formed between the catalytic layer and the base material.
(4) The method for producing a carbonate ester according to any one of (1)-(3), wherein the amount of the supported solid catalyst in the catalytic layer is 15 g/m² to 150 g/m².
(5) The method for producing a carbonate ester according to any one of (1)-(3), wherein the amount of the supported solid catalyst in the catalytic layer is 15 g/m² to 70 g/m².
(6) The method for producing a carbonate ester according to any one of (1)-(5), wherein the base material has through-holes that serve as flow paths for the monohydric alcohol and carbon dioxide, and
the catalytic layer is formed on the surface of the through-holes.
(7) The method for producing a carbonate ester according to any one of (1)-(6), wherein the solid catalyst further contains an oxide of a rare-earth element.
(8) The method for producing a carbonate ester according to (7), wherein the solid catalyst contains lanthanum oxide.
(9) The method for producing a carbonate ester according to any one of (1)-(8), wherein the average thickness of the catalytic layer is 12 μm-150 μm.
(10) The method for producing a carbonate ester according to any one of (1)-(9), wherein the base material is a metal honeycomb.
(11) The method for producing a carbonate ester according to any one of (1)-(10), wherein the hydration agent contains a nitrile compound.
(12) The method for producing a carbonate ester according to any one of (1)-(11), wherein the hydration agent contains 2-cyanopyridine.
(13) A catalytic structure for producing a carbonate ester comprising:
a base material; and
a catalytic layer which is formed on at least a part of the surface of the base material and which contains a solid catalyst and an inorganic binder,
wherein:
the solid catalyst contains cerium oxide;
the amount of the supported solid catalyst is 15 g/m² to 200 g/m²; and
the inorganic binder contains silica and/or alumina.
(14) The catalytic structure for producing a carbonate ester according to (13), wherein the amount of the supported solid catalyst is 15 g/m² to 150 g/m².
(15) A device for producing a carbonate ester comprising:
the catalytic structure for producing a carbonate ester according to either one of (13) and (14); and
a supply path for supplying at least a monohydric alcohol and carbon dioxide to the catalytic structure.
(16) The device for producing a carbonate ester according to (15), further comprising a discharge path through which a carbonate ester generated from the monohydric alcohol and carbon dioxide passes.
(17) The device for producing a carbonate ester according to either one of (15) and (16), wherein a plurality of catalytic structures are arranged in line.
(18) The device for producing a carbonate ester according to either one of (15) and (16), comprising an integrated structure having a plurality of catalytic structures arranged in parallel.
(19) A method for producing a carbonate ester, the method comprising a step of circulating a reaction substrate containing the monohydric alcohol and carbon dioxide through the device for producing a carbonate ester according to any one of (15)-(18) at space velocity (per minute) of 0.005 to 5000.

Advantageous Effect of the Invention

The present invention can provide a method for producing a carbonate ester and a catalytic structure for producing a carbonate ester, which, when a catalytic structure having a sufficient amount of cerium oxide-containing solid catalyst supported on a base material is used, can suppress pulverization and separation of the solid catalyst and which can provide highly efficient reaction for producing a carbonate ester.

BRIEF DESCRIPTION OF THE DRAWINGS

FIG. 1 A partially enlarged cross-sectional view showing a catalytic structure for producing a carbonate ester according to one embodiment of the present invention.

FIG. 2 A partially enlarged cross-sectional view showing a catalytic structure for producing a carbonate ester according to another embodiment of the present invention.

FIG. 3 A graph showing outcomes of the carbonate ester-generating reaction (changes in catalytic activity retention rates) using the catalytic structure for producing a carbonate ester according to one embodiment of the present invention and a catalytic structure used for comparison.

FIG. 4 A side view showing a specific example of a device for producing a carbonate ester comprising catalytic structures.

FIG. 5(A) is a plan view (A) and FIG. 5(B) is a bottom view (B) showing the device for producing a carbonate ester comprising catalytic structures.

FIG. 6 Schematic views showing one exemplary shape of the device for producing a carbonate ester comprising catalytic structures suitable for factory-scale use.

FIG. 7(A) and FIG. 7(B) are views showing specific examples of the honeycomb-like base material (metal honeycomb) used in a device for producing a carbonate ester, which have a cylindrical outer shape (FIG. 7(A)) and a rectangular cuboid outer shape (FIG. 7(B)), respectively.

FIG. 8 A diagram schematically showing a specific example of carbonate ester-producing equipment comprising devices such as a device for producing a carbonate ester and the like.

EMBODIMENTS FOR CARRYING OUT THE INVENTION

Hereinafter, a preferred embodiment of the present invention will be described in detail with reference to the attached drawings. Herein, components having substantially the same functional configurations are denoted by the same reference numerals in the specification and the figures to omit redundant explanation. In addition, the components in the figures are each emphasized according to convenience, and the aspect ratio and the dimensions of the components in the figures do not represent the actual aspect ratio and dimensions of the components.

<1. Catalytic Structure for Producing Carbonate Ester>

First, a preferred embodiment of a catalytic structure for producing a carbonate ester of the present invention will be described. FIG. 1 is a partially enlarged cross-sectional view of a catalytic structure for producing a carbonate ester according to this embodiment. The catalytic structure for producing a carbonate ester 1 according to this embodiment (hereinafter, also simply referred to as a "catalytic structure") catalyzes generation of a carbonate ester from carbon dioxide and a monohydric alcohol in the presence of a hydration agent.

The catalytic structure for producing a carbonate ester 1 according to this embodiment comprises a base material 10, and a catalytic layer 20 which is formed on at least a part of the surface of the base material 10 and which contains a solid catalyst 40 and an inorganic binder 50, wherein: the solid catalyst 40 contains cerium oxide; the amount of the supported solid catalyst 40 in the catalytic layer 20 is 15 g/m$^2$ to 200 g/m$^2$; and the inorganic binder 50 contains silica and/or alumina. Moreover, according to this embodiment, the catalytic structure for producing a carbonate ester 1 is provided with an intermediate layer 30 comprising the inorganic binder 50 between the catalytic layer 20 and the base material 10.

(1.1. Base Material)

The base material 10 is a catalyst-supporting structure for supporting the solid catalyst 40. Accordingly, the solid catalyst 40 can be affixed to the surface of the base material 10 so that uneven distribution of the solid catalyst 40 in the reaction vessel upon reaction can be suppressed and local temperature variation in the reaction vessel caused by heat generated upon reaction can be reduced as compared to a case where a powdery catalyst is directly used. Therefore, according to this embodiment, a product can be synthesized in a highly efficient manner.

Furthermore, the catalytic structure for producing a carbonate ester 1 can be taken out from the reaction vessel and thereafter subjected to a regeneration treatment such as a heat treatment or the like to restore its function even if the activity of the solid catalyst 40 is decreased after a long period of continuous reaction, and thus it can easily be used continuously for a long period of time. Moreover, as will be described in detail, the components of the solid catalyst 40 can be adjusted to maintain excellent catalytic function and decrease frequency of the regeneration treatment.

The base material 10 is not particularly limited as long as it allows formation of a catalytic layer 20 containing a solid catalyst 40, and may have any shape and dimensions. In particular, the base material 10 preferably have through-holes that serve as flow paths for the monohydric alcohol and carbon dioxide. Since the base material 10 has such through-holes, diffusion efficiency of the raw materials, i.e., the monohydric alcohol and carbon dioxide, can be enhanced, and products such as the carbonate ester and the by-produced water can be collected easily. Furthermore, the catalytic layer 20 is provided on the surface of the through-holes so that the area of the catalytic layer 20 making contact with the raw materials, i.e., the monohydric alcohol and carbon dioxide, can be increased to enhance the efficiency of the reaction for generating the carbonate ester.

The base material 10 can have a shape such as a porous shape like a foam-like shape, a corrugated shape, a honeycomb-like shape (monolith form), a mesh shape, a columnar shape, a cylindrical shape or the like. In particular, the base material 10 preferably has a porous shape, a foam-like shape, a honeycomb-like shape or a mesh shape. Since these shapes can be provided with through-holes, the above-described advantages obtained by providing through-holes can favorably be earned. In particular, when the base material 10 has a honeycomb-like shape, the specific surface area of the through-holes can be made relatively large while improving physical strength of the base material 10 and shape stability of the base material 10.

While the cross-sectional shape of the honeycomb-like through-hole is not particularly limited, it can be a polygon such as a triangle, a quadrilateral or a hexagon or any waveform like a sine wave (fin shape).

While the pore size of the through-hole of the base material 10 is not particularly limited, it is, for example, 0.3-6 mm and preferably 0.5-5 mm. Similarly, while the number of the through-holes (cell number) in the base material 10 is not particularly limited, it can be, for example, 25-1200 cells/inch$^2$ (3.9-186 cells/cm$^2$) and preferably 100-600 cells/inch$^2$ (15.5-93 cells/cm$^2$).

In addition, the material composing the base material 10 is not particularly limited and it may be a metal material such as stainless steel or aluminum steel, or any ceramic material such as cordierite, mullite, silicon carbide, alumina, silica, titania, zirconia or ceria.

The base material 10 is a honeycomb-like base material composed of a metal material or a ceramic, namely, a ceramic honeycomb or a metal honeycomb, and particularly preferably a metal honeycomb. A metal material such as stainless steel (martensitic, ferritic, austenitic, austenite-ferrite duplex or precipitation strengthening steel) can be used as the material of the base material 10 to enhance the thermal conductivity of the base material 10. As a result, heat generated by the reaction can easily be taken away from the reaction vessel along with the movement of the raw material substances to stably maintain uniform temperature in the catalyst tank, thereby enabling the catalytic layer 20 to stably exert high catalytic activity for a long period of time. Alternatively, if a ceramic is used form the base material 10, adhesiveness of the catalytic layer 20 to the base material 10 can further be enhanced. Here, a specific example of a metal honeycomb without a catalytic layer is shown in FIG. 6.

(1.2. Catalytic Layer)

The catalytic layer 20 is formed on at least a part of the surface of the base material 10 via an intermediate layer 30 that will be described later. As will be described in detail, however, the catalytic layer 20 may also be layered directly on the surface of the base material 10.

In general, the catalytic layer 20 is formed on the inner wall of the through-holes of the base material 10. The catalytic layer 20 comprises a solid catalyst 40 containing cerium oxide and catalyzes reaction that generates a carbonate ester from carbon dioxide and a monohydric alcohol.

In the catalytic layer 20, the solid catalyst 40 contains at least cerium oxide. Cerium oxide has excellent catalytic activity in the reaction that generates a carbonate ester from carbon dioxide and a monohydric alcohol. Meanwhile, while cerium oxide is generally vulnerable to pulverization, cerium oxide in this embodiment is tightly affixed to the base material 10 by an inorganic binder 50 that will be described later so that separation is suppressed and pulverization is prevented.

The solid catalyst 40 may further contain one or more kinds of catalysts other than cerium oxide. Any catalyst that can catalyze reaction between carbon dioxide and a monohydric alcohol can be used as such a catalyst, and examples thereof include a tin compound, a thallium compound, a nickel compound, a vanadium compound, a copper compound, alkaline carbonate, zirconium oxide, titanium oxide and a rare-earth element (especially, an oxide thereof) other than cerium. Among them, zirconium oxide is preferable for having high catalytic activity. In this case, the proportion of cerium oxide in the solid catalyst 40 is, for example, 5 atomic-percent (at. %) or more and preferably 20 at. % or more. Furthermore, the proportion of cerium oxide in the solid catalyst 40 may be 100 at. %.

If a cerium oxide catalyst is continuously used for the reaction for directly synthesizing a carbonate ester, the catalytic activity decreases with time and thus a regeneration treatment for the catalyst may be required relatively frequently. However, high catalytic activity can be maintained by adjusting the components of the catalyst. For example, when a rare-earth element other than cerium is added as a cocatalyst component, the catalytic activity of the solid catalyst 40 is likely to be maintained high during the reaction for generating a carbonate ester for a longer period of time.

Examples of a rare-earth element other than cerium include scandium, yttrium, lanthanum, praseodymium, neodymium, promethium, samarium, europium, gadolinium, terbium, dysprosium, holmium, erbium, thulium, ytterbium and lutetium. Among these rare-earth elements, lanthanum, praseodymium or gadolinium are preferably added to the solid catalyst 40 and use of lanthanum is particularly favorable. Here, such a metal element is contained in the solid catalyst 40 or exists in the outer layer of the solid catalyst 40 mainly as an oxide.

The proportion of the cocatalyst component, for example, an oxide of a rare-earth element, in the solid catalyst 40 is preferably 0.01-10 mass %, more preferably 0.05-5.0 mass %, still more preferably 0.1-2.5 mass %, and particularly preferably 0.2-2.0 mass %, for example, 1 mass %, relative to the total weight of the solid catalyst.

Furthermore, the amount of the solid catalyst 40 supported by the catalytic layer 20 is 15 g/m$^2$ to 200 g/m$^2$. Accordingly, the efficiency of the reaction catalyzed by the catalytic structure 1 can be increased. On the other hand, if the amount of the supported solid catalyst 40 is less than 15 g/m$^2$, the efficiency of the reaction catalyzed by the catalytic structure 1 may not be sufficient. Moreover, if the amount of the supported solid catalyst 40 exceeds 200 g/m$^2$, the raw material substrate may diffuse to the deep part of the catalytic layer 20 and become an obstacle, which, on the contrary, deteriorates the reaction efficiency. The present inventors found that the amount of the supported solid catalyst 40 and the reaction efficiency does not have a simple positive correlation but there is an appropriate range for the amount of the supported solid catalyst 40 to achieve high reaction efficiency. Since such a relatively large amount of solid catalyst 40 can be supported by the catalytic structure 1, reactivity can be maintained high even at a high raw material supplying rate, and the size of the reactor can be made relatively small to suppress plant cost.

From the viewpoint of increasing the efficiency of the reaction catalyzed by the catalytic structure 1, the amount of the supported solid catalyst 40 in the catalytic layer 20 is, for example, 10 g/m$^2$ to 200 g/m$^2$, preferably 15 g/m$^2$ to 150 g/m$^2$, more preferably 15 g/m$^2$ to 70 g/m$^2$ and still more preferably 15 g/m$^2$ to 30 g/m$^2$.

Similarly, from the viewpoint of increasing the efficiency of the reaction catalyzed by the catalytic structure 1, the amount of cerium oxide supported by the catalytic layer 20 is, for example, 10 g/m$^2$ to 200 g/m$^2$, preferably 15 g/m$^2$ to 150 g/m$^2$, more preferably 15 g/m$^2$ to 70 g/m$^2$ and still more preferably 15 g/m$^2$ to 30 g/m$^2$.

Here, when the solid catalyst 40 is supported in an amount within the above-mentioned range, the thickness of the catalytic layer 20 is about 12 μm-150 μm in average, which is significantly larger than the thickness of the catalytic layers formed by the methods employed in Patent documents 2-5 (which is about 5 μm at best). It has conventionally been difficult to support such a large amount of solid catalyst 40 without inhibiting its reaction activity, this embodiment has solved this problem by use of an inorganic binder 50 which will be described later. The average thickness of the catalytic layer 20 may be about 12 μm-180 μm and preferably about 15 μm-150 μm.

In addition, the thickness of the catalytic layer 20 formed on the through-holes of the base material 10 depends on the shape of the through-holes and thus is not necessarily uniform. A uniform catalytic layer can be formed on a plate-like base material by a doctor blade method or the like to obtain correlation between the amount of the solid catalyst in the catalytic layer and the thickness of the catalytic layer, so that even when through-holes are formed, the average thickness of the catalytic layer 20 of the base material 10 can be determined based on the weight of the supported solid catalyst 40 as the apparent thickness. Herein, the (average) thickness of the catalytic layer 20 was all determined according to this method.

Furthermore, while the average particle size of the solid catalyst 40 used upon production is not particularly limited, it is, for example, 0.001 μm to 100 μm, preferably 0.005 μm to 100 μm, more preferably 0.01 μm to 80 μm, still more preferably 0.1 μm to 60 μm, particularly preferably 1.0 μm to 30 μm and much more preferably 3.0 μm to 15 μm. Accordingly, the specific surface area of the solid catalyst 40 can be made relatively large to enhance the efficiency of the catalysis reaction and the solid catalyst 40 can be prevented from separating from the inorganic binder 50.

Herein, an "average particle size" refers to a volume-based 50% particle size distribution (D50) as measured by laser diffraction/scattering method in a wet state. When a measurement by the laser diffraction/scattering method is difficult due to poor dispersibility or the like, a technique such as observation with a scanning electron microscope, calculation from x-ray diffraction measurement, imaging method or the like can be applied.

Moreover, in addition to the above-described solid catalyst 40, the catalytic layer 20 also contains an inorganic binder 50 for affixing the solid catalyst 40. The inorganic binder 50 contains silica and/or alumina. As a result of extensive studies, the present inventors found that when silica and/or alumina was used as the inorganic binder 50, the solid catalyst 40 can be supported in a relatively large amount without inhibiting the catalytic activity of the solid catalyst 40. Such an inorganic binder 50 allows the solid catalyst 40 containing cerium oxide to be tightly affixed to the base material 10 and suppresses the solid catalyst 40 to separate or fall off during the reaction. As a result, the catalytic structure 1 can be used for a long period of time while maintaining its activity high. Furthermore, the inorganic binder can be used to keep adhesiveness between the catalytic layer 20 and the base material 10 without degenerating the catalytic layer 20 even when the reaction temperature or the regeneration treatment temperature becomes relatively high.

Silica and alumina that can be contained in the inorganic binder 50 are not particularly limited, and may be any silica and alumina that are formed using a suitable compound as a precursor. These silica and alumina may be either amorphous or crystalline. The inorganic binder 50 may further contain a component other than silica and alumina. Examples of such a component include magnesium, calcium and impurities that may be mixed during production of the inorganic binder 50. Moreover, the proportion of the total amount of silica and alumina in the inorganic binder 50 is preferably 20 mass % or more, and more preferably 50 mass % or more. Still more preferably, the inorganic binder 50 is substantially composed of silica and/or alumina and particularly preferably composed of silica and/or alumina.

Moreover, since silica and alumina usually exist as an assembly (agglomerate) of fine particles in the inorganic binder 50, the inorganic binder 50 is porous. Since the inorganic binder 50 is porous, the raw materials, i.e., carbon dioxide and the monohydric alcohol, can reach the surface of the solid catalyst 40 that is not exposed to the surface of the catalytic layer 20.

While the specific surface area of the solid particles in the inorganic binder 50 is not particularly limited, it may be, for example, 1 $m^2/g$ to 1000 $m^2/g$ and preferably 10 $m^2/g$ to 500 $m^2/g$. As long as the specific surface area of the inorganic binder 50 lies within the above-mentioned range, the rates of carbon dioxide and the monohydric alcohol to diffuse in the inorganic binder 50 will be high enough to accelerate the reaction on the surface of the solid catalyst 40 and the solid catalyst 40 can be affixed further tightly to the catalytic layer 20. The specific surface area can be measured by a BET method.

Here, the amount of the solid component in the inorganic binder 50 supported by the catalytic layer 20 is, for example, 1 $g/m^2$ to 100 $g/m^2$ and more preferably 1 $g/m^2$ to 40 $g/m^2$: Accordingly, the exposed area of the solid catalyst 40 can be made large to enhance the reaction efficiency as well as to tightly affix the solid catalyst 40 to the base material 10.

Furthermore, the solid component in the inorganic binder 50 is contained in the catalytic layer 20 at a proportion of, for example, 0.01 g to 5 g and preferably 0.10 g to 1.0 g per 1 g of the solid catalyst. Accordingly, the exposed area of the solid catalyst 40 can be made large to enhance the reaction efficiency as well as to tightly affix the solid catalyst 40 to the base material 10.

Here, the solid component contained in the inorganic binder 50 refers to inorganic oxide particles that are intentionally introduced into the binder and solidified matters in the binder. The mass ratio of the solid component in the inorganic binder can be determined by dividing the mass remaining after drying and curing only the inorganic binder, by the mass of the inorganic binder before drying and curing. Hence, the mass of the solid component in the inorganic binder can be calculated by (mass ratio of the solid component) x (mass of applied inorganic binder).

(1.3. Intermediate Layer)

An intermediate layer 30 is a layer composed of the inorganic binder 50, which is disposed between the base material 10 and the catalytic layer 20. Accordingly, the intermediate layer 30 composed of the inorganic binder 50 can be formed between the catalytic layer 20 containing the solid catalyst 40 and the base material 10 so that adhesiveness of the catalytic layer 20 to the base material 10 can be further enhanced, thereby preventing separation of the solid catalyst 40 from the catalytic structure 1. In addition, such an intermediate layer 30 can be provided so as to make adhesiveness between the catalytic layer 20 and the base material 10 adequate even when the base material 10 used intrinsically has poor adhesiveness to the catalytic layer 20.

Since the component of the inorganic binder 50 can be the same as the catalytic layer 20 described above, description thereof is omitted. However, the inorganic binder 50 of the catalytic layer 20 and the inorganic binder of the intermediate layer 30 may be different or the same in terms of their composition.

Moreover, the amount of the solid component in the inorganic binder 50 supported by the intermediate layer 30 is, for example, 1 $g/m^2$ to 100 $g/m^2$, and more preferably 10 $g/m^2$ to 50 $g/m^2$. Within the above-mentioned range, adhesiveness between the catalytic layer 20 and the base material 10 can be further enhanced while preventing cohesive fracture of the intermediate layer 30.

In the thus-described catalytic structure for producing a carbonate ester 1 according to this embodiment, a relatively large amount of solid catalyst 40 is tightly affixed in the catalytic layer 20 by the inorganic binder 50 containing silica and/or alumina. In addition, the inorganic binder 50 does not inhibit the catalysis reaction by the solid catalyst 40. As a result, if the catalytic structure for producing a carbonate ester 1 is used to produce a carbonate ester, efficiency of the reaction to generate the carbonate ester can be enhanced. Moreover, since the solid catalyst 40 is tightly affixed to the base material 10 by the inorganic binder 50, separation of the solid catalyst 40 from the catalytic structure for producing a carbonate ester 1 and therefore pulverization of the solid catalyst 40 can be prevented.

With such a catalytic structure for producing a carbonate ester 1, high reaction efficiency can be realized even in a reaction conducted at a fast flow rate that is required for an industrial process. Moreover, since separation and pulverization of the solid catalyst 40 can be prevented, it is highly durable and can repeatedly be used even in a harsh environment required for an industrial process.

The catalytic structure for producing a carbonate ester 1 according to this embodiment has been described but the present invention should not be limited to this embodiment. FIG. 2 is a partially enlarged cross-sectional view of a catalytic structure for producing a carbonate ester according to another embodiment of the present invention. In the catalytic structure for producing a carbonate ester 1A shown in FIG. 2, a catalytic layer 20 is provided on a base material 10. Unlike the above-described catalytic structure for producing a carbonate ester 1, the intermediate layer composed of the inorganic binder 50 is omitted. Even if an intermediate layer is omitted like this case, the solid catalyst 40 in the catalytic layer 20 is sufficiently affixed by the inorganic binder 50 containing silica and/or alumina, thereby preventing separation of the solid catalyst 40 from the catalytic structure for producing a carbonate ester 1A and pulverization of the solid catalyst 40 associated therewith.

The boundary between the catalytic layer 20 and the intermediate layer 30 can be observed by an elemental analysis or the like using an optical microscope, a scanning electron microscope, EDS (energy dispersive x-ray spectrometer) or the like.

Furthermore, the ratio of the metal component (for example, cerium) existing in the catalytic layer 20 can be determined by an elemental analysis so as to calculate the amount of the solid catalyst 40 supported by the catalytic layer 20 based on the area of the catalytic layer and the total mass supported by the catalytic layer 20. Specifically, when the component of the solid catalyst 40 is cerium oxide, it can be calculated according to the following equation.

(Amount of the supported solid catalyst)=[(Mass of catalytic layer)×(Mass ratio of cerium in catalytic layer)×((Mass of cerium oxide)/(Mass of cerium))]/(Area of catalytic layer)

This value is equal to the mass of the solid catalyst 40 per unit area of the base material 10 where the solid catalyst 40 exists, and can be determined regardless of the presence of the intermediate layer 30.

As the elemental analysis method for identifying the metal component, scanning-type high-frequency inductively coupled plasma (ICP) can be employed. The amount of the inorganic binder 50 supported by the catalytic layer 20 or the intermediate layer 30 can be determined by similarly calculating the ratio of the solid component contained in the inorganic binder used for forming the catalytic layer 20 or the intermediate layer 30 from the ratio of the metal component determined by the above-described elemental analysis. Here, the area of the catalytic layer refers to the area of a part applied (formed) with the solid catalyst 40 (catalytic layer 20). For example, when the base material 10 has a honeycomb shape and the outer periphery is not applied with the catalytic layer 20, the area of the catalytic layer refers to the whole surface area forming the through-holes inside the base material 10 where the catalytic layer 20 is applied. In a case where an intermediate layer 30 is provided, the amount of the supported solid catalyst 40 can be determined in a similar manner.

<2. Method for Producing Catalytic Structure for Producing Carbonate Ester>

Next, a method for producing a catalytic structure for producing a carbonate ester according to this embodiment will be described by illustrating a method for producing the catalytic structure for producing a carbonate ester 1.

First, a stock binder solution for forming an intermediate layer 30 is prepared. The stock binder solution can be obtaining by dissolving or dispersing a material of the inorganic binder 50, for example, alumina, silica or a precursor thereof in an appropriate liquid medium such as water or alcohol. Here, the concentration of the material of the inorganic binder 50 in the stock binder solution is not particularly limited, and can appropriately be determined according to the method for applying the stock binder solution to the base material 10.

Next, the base material 10 is prepared to form an intermediate layer 30 thereon. Specifically, the stock binder solution is applied, dried and cured on the base material 10. The stock binder solution may be applied by any method such as coating using a bar coater, a doctor blade, a roll coater, a comma coater, die coating, gravure coating, spin coating, slit coating or the like, ink jetting, spraying, immersion or the like. In particular, if the base material 10 has through-holes, immersion, specifically, immersion of the base material 10 in the stock binder solution, is preferable. In order to increase the film thickness of the intermediate layer 30, the binder solution may be applied repeatedly for multiple times.

Subsequently, the stock binder solution applied on the base material 10 is dried and cured to form an intermediate layer 30. The drying temperature may be any temperature that can remove the liquid medium, and can suitably be set according to the boiling point of the medium. For example, in the case of water, the temperature may be 60° C. to 100° C. Moreover, the drying time can suitably be set according to the dried state. The curing temperature can suitably be set according to the curing temperature of the cure component in the binder. For example, in the case of a siloxane-based material, the curing temperature may be 120° C. to 200° C. The curing time is also not particularly limited and can suitably be determined.

Next, a catalytic layer-forming mixture for forming the catalytic layer 20 is prepared. The catalytic layer-forming mixture can be obtained by dissolving or dispersing the solid catalyst 40 and a material of the inorganic binder 50 such as alumina, silica or a precursor thereof in an appropriate liquid medium such as water or alcohol.

Then, a catalytic layer 20 is formed on the intermediate layer 30 laminated on the base material 10 or on the base material 10. Specifically, the catalytic layer-forming mixture is applied, dried and cured on the surface of the intermediate layer 30 or the surface of the base material 10. The catalytic layer-forming mixture may be applied by any method such as coating using a bar coater, a doctor blade, a roll coater, a comma coater, die coating, gravure coating, spin coating, slit coating or the like, ink jetting, spraying, immersion or the like. In particular, if the base material 10 has through-holes, immersion, specifically, immersion of the base material 10 in the catalytic layer-forming mixture, is preferable. In order to increase the film thickness of the catalytic layer 20, the catalytic layer-forming mixture may be applied repeatedly for multiple times.

Subsequently, the catalytic layer-forming mixture applied to the base material 10 is dried and cured to form a catalytic layer 20. As a result, a catalytic structure 1 according to this embodiment can be obtained. The drying temperature may be any temperature that can remove the liquid medium, and can suitably be set according to the boiling point of the medium. For example, in the case of water, the temperature may be 60° C. to 100° C. Moreover, the drying time can suitably be set according to the dried state. The curing temperature can suitably be set according to the curing temperature of the curable component in the binder. For example, in the case of a siloxane-based material, the curing temperature may be 120° C. to 200° C. The curing time is also not particularly limited and can suitably be determined.

Adhesiveness at the boundary between the surface of the base material 10 and the intermediate layer 30 or the catalytic layer 20 may not be adequate. Therefore, prior to applying (forming) the intermediate layer 30 or the catalytic layer 20 directly to the base material 10, the following pretreatment step is preferably performed. Specifically, the base material is first washed with a volatile organic solvent such as alcohol or acetone and dried to remove the oil content on the surface of the base material 10. Thereafter, the base material 10 is immersed in an alkaline aqueous solution, washed with water and dried. Then, the metal base material is immersed in an acidic aqueous solution, washed with water and dried. Alternatively, the base material 10 may be subjected to a chemical treatment, a heat treatment, a plasma treatment, UV treatment or corona treatment.

<3. Method for Producing Carbonate Ester>

Hereinafter, a method for producing a carbonate ester by using the above-described catalytic structure for producing a carbonate ester will be described according to a preferred embodiment. The method for producing a carbonate ester according to this embodiment comprises a step of allowing a monohydric alcohol and carbon dioxide to react with each other to produce a carbonate ester in the presence of the above-described catalytic structure 1 and a hydration agent.

Before explaining the method for producing a carbonate ester according to this embodiment, the mechanism of the reaction in this method will be first described. First, the catalytic structure 1 catalyzes the reaction between a monohydric alcohol and carbon dioxide expressed by Formula (1) below.

$$2ROH + CO_2 \leftrightarrow (RO)_2CO + H_2O \quad (1)$$

The solid catalyst 40 of the catalytic structure 1 is considered to have a catalytic mechanism that involves dissociative adsorption of alcohol in the form of R—O—M (M represents the solid catalyst 40) and formation of RO—C(=O)—O . . . M with $CO_2$ on the basic point, and adsorption of alcohol in the form of HO—R . . . M on the acidic point, whereby RO—C(=O)—OR is generated from both adsorbed species.

Meanwhile, the reaction expressed by Formula (1) above is a reversible reaction. Therefore, in the presence of the by-produced water, it reacts with the generated carbonate ester again and return to a monohydric alcohol and carbon dioxide. Accordingly, a hydration agent is used to perform hydration reaction expressed by Formula (2) below in order to remove the water generated as by-product.

$$H_2O + R'CN \rightarrow R'C(=O)—NH_2 \quad (2)$$

Since water is removed via the reaction expressed in Formula (2) above, reversible reaction in Formula (1) is suppressed and reaction for generating a carbonate ester is accelerated. While the reason is not clear, the solid catalyst 40 seems to also have catalytic activity for the hydration reaction expressed in Formula (2) above. Hence, mechanism of the reaction that occurs in this method has been described.

As described above, the method for producing a carbonate ester according to this embodiment comprises a step of allowing a monohydric alcohol and carbon dioxide to react with each other to produce a carbonate ester in the presence of the above-described catalytic structure 1 and a hydration agent.

Specifically, the catalytic structure 1 is provided in a reaction vessel, and a hydration agent, a monohydric alcohol and carbon dioxide are introduced into the reaction vessel, thereby allowing reaction for a carbonate ester.

As the monohydric alcohol, one or more compounds selected from a primary alcohol, a secondary alcohol and a tertiary alcohol can be used.

Specifically, examples of the monohydric alcohol include methyl alcohol, ethyl alcohol, n-propyl alcohol, isopropyl alcohol, n-butyl alcohol, isobutyl alcohol, sec-butyl alcohol, tert-butyl alcohol, n-pentyl alcohol, n-hexanol, 2-hexanol, 3-hexanol, heptanol, hexanol and phenol.

The kind of the monohydric alcohol may suitably be selected according to the chemical structure of the carbonate ester of interest and the method of using the resulting carbonate ester.

While the hydration agent is not particularly limited as long as it can react with water and remove water, it may be a cyano group-containing compound as shown in Formula (2) above, where one or more kinds of them can be used alone or in combination. Specifically, examples include acetonitrile, cyanoethane, 1-cyano-propane, 2-cyano-propane, cyanoethylene, phenylacetonitrile, benzonitrile, 2-cyanopyridine, 2-cyanopyrazine, 2-cyanopyrimidine, thiophene-2-carbonitrile and 2-fluonitrile (2-cyanofuran). In particular, it is preferably 2-cyanopyridine from the viewpoint of the efficiency of removing water, i.e., the rate of the hydration reaction.

The amount of the hydration agent used may suitably be determined according to the amount of the monohydric alcohol used. For example, the hydration agent is 0.01 to 2 moles and preferably 0.1 to 0.5 moles per 1 mole of the monohydric alcohol used.

While the temperature of the reaction for generating a carbonate ester is not particularly limited, it is preferably 50° C. to 300° C. If the reaction temperature is lower than 50° C., the reaction rate may be low depending on the kind of the reaction substrate and both of the reaction for synthesizing a carbonate ester and the hydration reaction by the hydration agent hardly proceed, thereby rendering productivity of the carbonate ester low. On the other hand, if the reaction temperature exceeds 300° C., the reaction rate of each reaction becomes high but the carbonate ester and the amide monomer resulting from the hydration reaction are likely to be degenerated into other monomer or likely to be polymerized depending on the kind of the reaction substrate, thereby rendering the yield of the carbonate ester low. The reaction temperature is still more preferably 100° C. to 200° C. Since this reaction temperature is considered to vary depending on the kind and the amount of the solid catalyst 40 and the amounts or the ratio of the raw materials (monohydric alcohol, hydration agent), optimal conditions are preferably determined accordingly.

While the reaction pressure is not particularly limited, it is preferably 0.1 MPa to 20 MPa (absolute pressure). If the reaction pressure is lower than 0.1 MPa (absolute pressure), a decompression device will be required, which not only complicates the equipment and increases the cost but also requires power energy for decreasing the pressure, thereby rendering the energy efficiency poor. On the other hand, if the reaction pressure exceeds 20 MPa, the hydration reaction by the hydration agent may hardly proceed depending on the kind of the hydration agent, which not only deteriorates the yield of the carbonate ester but also but also requires power energy for increasing the pressure, thereby rendering the energy efficiency poor. From the viewpoint of increasing the yield of the carbonate ester, the reaction pressure is preferably 0.1 MPa to 10 MPa (absolute pressure).

While the reaction time is not particularly limited and may be determined suitably according to the kind of the reaction substrate (raw materials), the kind of the hydrate and the by-product-generating rate, it is, for example, 5 minutes to 24 hours, preferably 15 minutes to 8 hours, and still more preferably 30 minutes to 6 hours. Here, when a continuous reactor is used, the total time that takes from introduction of the material into the reaction vessel to discharge of the resultant from the reaction vessel considering the flow rate of the raw material may be assumed as the reaction time (retention time). Moreover, when the reaction substrate is circulated in the catalytic structure to allow reaction, the circulation flow rate can be defined by space velocity expressed by Equation (3) below.

Space velocity (per minute)=Circulation flow rate $(m^3/min)$/Volume of catalytic structure $(m^3)$   (3)

While the space velocity is not particularly limited, it is, for example, 0.005 to 5000 per minute, preferably 0.05 to 500 per minute and still more preferably 0.5 to 50 per minute. If the space velocity is too low, $CO_2$ is digested before it passes through the catalytic structure and thus the reaction efficiency may be poor and the side reaction may increase. On the other hand, higher space velocity requires larger size of the pump and thus the energy efficiency may be poor. A carbonate ester can be produced efficiency by circulating a reaction substrate containing the raw materials in the device for producing a carbonate ester at a space velocity within the above-mentioned range, for example, 0.005 to 5000 (per minute).

Hence, a carbonate ester can efficiently be produced. Furthermore, since the catalytic structure 1 according to the above-described embodiment is used in this embodiment, the solid catalyst 40 is prevented from separating from the catalytic structure 1 and from being pulverized. Therefore, the catalytic structure 1 can repeatedly be used even in a harsh environment required for an industrial process. Furthermore, the catalyst component can be adjusted in order to further improve the activity of the solid catalyst 40 that can be maintained for a long period of time.

<4. Device for Producing Carbonate Ester>

Hereinafter, a device for producing a carbonate ester will be described based on a preferred embodiment. A device for producing a carbonate ester comprises the above-described catalytic structure for producing a carbonate ester. As a specific example, a device for producing a carbonate ester 60 comprises a housing (casing) 62 shown in FIGS. 4 and 5. The housing 62 is made of, for example, a SUS pipe or the like, and accommodates the catalytic structure for producing a carbonate ester 1 inside. The device for producing a carbonate ester 60 preferably comprises a plurality of catalytic structures for producing a carbonate ester 1, where these catalytic structures for producing a carbonate ester 1 are arranged, for example, in line.

The device for producing a carbonate ester 60 is provided with a supply path 64 which can supply raw materials for producing a carbonate ester, namely, a monohydric alcohol and carbon dioxide, to the catalytic structures for producing a carbonate ester 1. As indicated by Arrow A in FIG. 4, when the above-described raw materials are supplied to the device for producing a carbonate ester 60 via the supply path 64, the reaction for generating a carbonate ester proceeds inside the catalytic structure for producing a carbonate ester 1. Then, as indicated by Arrow B in FIG. 4, the carbonate ester generated by the carbonate ester-generating reaction is discharged from the device for producing a carbonate ester 60 together with unreacted raw materials and else via a discharge path 70.

In order to adjust the temperature of the carbonate ester-generating reaction, a heat transfer fluid (not shown) is supplied to the device for producing a carbonate ester 60. The heat transfer fluid can increase the temperature of the catalytic structure for producing a carbonate ester 1 and adjust the reaction temperature. Therefore, the device for producing a carbonate ester 60 is provided with a heat medium supplying pipe 66 for supplying the heat transfer fluid. The heat transfer fluid is supplied into the device for producing a carbonate ester 60 via an inlet 66A of the heat medium supplying pipe 66 as indicated by Arrow C in FIG. 4 and is discharged from the device for producing a carbonate ester 60 via an outlet 66B as indicated by Arrow D in FIG. 4. Thereafter, the temperature of the heat transfer fluid is adjusted to a predetermined temperature and then supplied into the device for producing a carbonate ester 60 again via the inlet 66A of the heat medium supplying pipe 66.

Here, the shape of the device for producing a carbonate ester 60 is not limited to the one described so far. For example, in order to increase the flow rate of the fluid containing the raw materials supplied via the supply path, the device for producing a carbonate ester may be designed into a shape adaptable to upsizing. Thus, if the size of the device for producing a carbonate ester is to be increased, a plurality of integrated structures 2 each having a plurality of parallelly arranged catalytic structures for producing a carbonate ester 1 may be arranged vertically in line as exemplified in FIG. 6. In a device for producing a carbonate ester 60A having such a structure, only an integrated structure 2 that has a catalytic structure 1 that seems to have deteriorated after a long-term operation can easily be exchanged and thus operating cost of the device required for the catalysis can be minimized. The structures 2 each having the plurality of parallelly integrated catalytic structures for producing a carbonate ester 1 are preferably provided with a sealing structure so as to ensure the fluid to pass through the catalytic structures 1. In addition, when the plurality of structures 2 each having the plurality of parallelly integrated catalytic structures for producing a carbonate ester 1 are to be vertically arranged in line, a space is preferably provided in between so as to ensure the fluid to steadily flow in the device for producing a carbonate ester 60A. In order to closely arrange the catalytic structures 1 at the cross-section of the device for producing a carbonate ester to minimize the size of the device, a rectangular cuboid catalytic structure 1B like one shown in FIG. 7 (B) may be employed. By using such a rectangular cuboid catalytic structure 1B, the plurality of catalytic structures 1B can be closely arranged at the cross-section of the device for producing a carbonate ester, thereby minimizing the storage capacity loss. The shape of the catalytic structure 1B, however, is not particularly limited, and the catalytic structure 1B may have a shape other than a rectangular cuboid. In addition, the catalytic structure 1B preferably has a porous, foam-like, honeycomb-like or mesh shape structure.

The integrated structure 2 preferably comprises a fixed plate 62A as a part of the housing 62 for supporting the plurality of catalytic structures 1B. The fixed plate 62A is provided with frames 62B corresponding to the outer shape of the catalytic structures 1B. The catalytic structure 1B is detachably fitted into the frame 62B as indicated by the arrow in FIG. 6. In addition, a rectangular cuboid honeycomb-like structure 1C which is free of a catalyst may be added to the integrated structure 2 instead of the catalytic structure 1B. The structure 1C that has a rectangular cuboid honeycomb structure but that does not support a catalyst may be employed to prevent the total amount of catalyst included in the device for producing a carbonate ester 60A from being excessive. A few (for example, 1 or 2) catalyst-free structures 1C can be provided in an integrated structure 2 that comprises several tens (for example, about 30-40 as shown in FIG. 6) of catalytic structures 1B to adjust the distribution of the catalyst to an appropriate level and suppress production of by-products.

The device for producing a carbonate ester 60A having a structure in which the catalytic structures 1 are not only arranged in line but also in parallel, in other words, a plurality of linearly arranged integrated structures 2 each having a plurality of parallelly arranged catalytic structures 1, can favorably be used in a reaction system in which the flow rate of the fluid containing the raw materials is, for example, 500 m³/h or more and preferably 550 m³/h or more. When a fluid is supplied at a flow rate lower than this, a device for producing a carbonate ester 60 having, for example, 10 or less catalytic structures 1 arranged only in line can be used.

<5. Carbonate Ester-Producing Equipment>

Hereinafter, a carbonate ester-producing equipment comprising the device for producing a carbonate ester and the like will be described based on a preferred embodiment. As can be appreciated from FIG. 7, a carbonate ester-producing equipment 100 comprises a device for producing a carbonate ester 60, a raw material supply system for supplying raw materials to the device for producing a carbonate ester 60, and a collection system for collecting the generated carbonate ester.

When the internal pressure of a $CO_2$ reservoir 72 which is a part of the supply system is increased with a $CO_2$ booster pump 73, carbon dioxide inside the $CO_2$ reservoir 72 is supplied to a buffer tank 74. Meanwhile, a liquid monohydric alcohol and 2-cyanopyridine as the raw materials stored in a raw material tank 76 are supplied from the raw material tank 76 to the buffer tank 74 by a raw material feed pump 78. Accordingly, carbon dioxide, the monohydric alcohol and else which are supplied from separate lines to the buffer tank 74 are mixed in the buffer tank 74. The mixture is supplied to the device for producing a carbonate ester 60 via a first filter 80.

In the device for producing a carbonate ester 60, the catalytic structure for producing a carbonate ester 1 accelerates the carbonate ester-generating reaction, and generates a carbonate ester corresponding to the kind of the monohydric alcohol as the raw material. The resulting carbonate esters is supplied to the collection system via a second filter 82. In the collection system, the liquid containing the carbonate ester and the liquid containing the unreacted raw materials, namely, the monohydric alcohol, 2-cyanopyridine and else, are separated, and thereafter a reaction solution circulating pump 84 sends the liquid containing the carbonate ester to a liquid extracting pump 86 while sending the liquid containing the monohydric alcohol back to the buffer tank 74. Liquid other than the carbonate ester is removed by the liquid extracting pump 86, thereby producing a highly pure carbonate ester.

EXAMPLES

Hereinafter, the present invention will be described in more detail by way of examples and comparative examples, although the present invention is not limited to these examples and comparative examples.

Example 1

1. Production of Catalytic Structure

Cerium oxide (HSA-20SP available from Solvay Special Chem Japan, Ltd., average particle size: about 10 μm, impurity concentration: 0.02% or lower) was calcined for 3 hours in air atmosphere at 873 K to give a powdery solid catalyst. Specifically, 20 g of cerium oxide was placed in a crucible of a muffle furnace (FO310 available from Yamato Scientific Co., Ltd.), where the temperature was increased at a heating rate of 10° C./min to 873 K prior to calcination. The resulting solid catalyst, a silica binder (Sumiceram P-750 (primarily a mixture of a siloxane-based binder and water) available from ASAHI Chemical Co., Ltd.) and water were weighed to give a weight ratio of 2.05:1:1 to prepare 50 g of a catalytic layer-forming mixture, which was used to fill a 50-cc beaker.

Furthermore, in order to prepare an intermediate layer between the catalytic layer and the catalyst-coated base material, a 50-cc beaker was filled with 50 g of the stock silica binder solution. A cylindrical metal honeycomb having a diameter of 19 mm φ, a length of 20 mm and 100 cells/inch² (steel type: YUS205M1, plate thickness: 50 μm, fin (corrugated foil) shape: sine wave, available from Nippon Steel and Sumikin Materials Co., Ltd.) was used as a catalyst-coated base material. This metal honeycomb was placed in the above-described beaker filled with the stock silica binder solution. After confirming that the whole honeycomb was immersed in the solution, the honeycomb was taken out and excess liquid was blown away using nitrogen gas. The coated honeycomb obtained was dried at 80° C. and cured at 150° C. to obtain an intermediate layer-coated honeycomb to which about 30 g/m² of silica, i.e., the binder component, was attached. The film thickness of the intermediate layer in this case was estimated to be about 20 μm.

Thereafter, this honeycomb was placed in a beaker containing the above-described mixture of cerium oxide and the binder. After confirming that the whole honeycomb was immersed in the solution, the honeycomb was taken out and excess liquid was blown away using nitrogen gas. The coated honeycomb obtained was dried at 80° C. and cured at 150° C., thereby applying silica, i.e., the binder component, and cerium oxide to the surface of the intermediate layer so as to obtain a catalytic structure according to this example which finally had about 15 g/m² of cerium oxide attached thereto. The film thickness of the catalytic layer in this case was estimated to be about 14 μm. Moreover, when only silica, i.e., the binder component, was similarly dried and cured as described above, the specific surface area thereof was 59 m²/g as measured by BET method.

2. Production of Carbonate Ester

Five of these catalytic structures were used (each having 0.3 g of cerium oxide attached thereto) and fixed to the center of a 1-inch SUS pipe that served as a fixed bed reactor (see FIGS. 4 and 5). 323 g of 1-propanol and 93 g of 2-cyanopyridine were weighted and mixed at a mole ratio 6:1 to give a mixture, which was supplied to the above-described fixed bed reactor at 150 m¹/min using a circulating pump while $CO_2$ was introduced into the pipe for purging. Then, the pressure was increased to an absolute pressure of 1.0 MPa. Moreover, the temperature was increased to 132° C. with a heater. The reaction was allowed to proceed for 6 hours starting from the time when the intended temperature was reached. Following 6 hours of reaction at 132° C., the reactor was cooled to room temperature, then the pressure was decreased to normal pressure, and the internal standard substance, i.e., 1-hexanol, was added. The resulting product was collected and analyzed by GC (gas chromatography).

The reaction degree of the synthetic reaction was determined by calculating the DPrC yield, namely, the yield of dipropyl carbonate as the resulting product (hereinafter, also referred to as "DPrC"), and the mole ratio of the by-products and DPrC based on the concentration of each components following the equations below (where the by-products refer to water that is produced with DPrC and products other than 2-picolinamide (hereinafter, also referred to "2-PA") which is a hydrate of 2-cyanopyridine (hereinafter, also referred to as "2-CP"). Here, the by-products were propyl carbamate, propyl picolinate, propyl pyridine-2-carboxyimidate and the like.

When alcohol (mol)/nitrile group (mol)≥2:

DPrC yield (mol %)=((Molar weight of DPrC)/(Molar weight of nitrile group fed))×100

When alcohol (mol)/nitrile group (mol)<2:

DPrC yield (mol %)=(2×(Molar weight of DPrC)/(Molar weight of 1-propanol fed))×100

By-products/DPrC (mol %)=(Sum of molar weights of by-product components)/(Molar weight of DPrC)×100

As a result, under the above-described conditions, the DPrC yield was high as 55 mol % and the by-products/DPrC ratio was suppressed to 1.0 mol %. In addition, the cerium oxide powder did not fall off from the base material and had adhesiveness even after the reaction. Furthermore, when this structure was repeatedly re-calcined and used for multiple times under the above-described reaction conditions, the reaction performance hardly changed and the cerium oxide powder was confirmed that it did not fall off from the base material.

Specifically, presence of deterioration of reaction efficiency due to repeated use of the catalyst through re-calcination and presence of falling of the catalyst were assessed according to the following criteria, and neither was observed in Example 1. Re-calcination of the catalyst was carried out by washing the used catalytic structure with the same kind of alcohol as one used for synthesizing dialkyl carbonate and then calcining the resultant at 300° C. for 3 hours on a heatproof dish in a muffle furnace after adjusting the oxygen concentration in the air to be equal to or below the explosion limit of alcohol by mixing nitrogen gas with the air. Alternatively, the catalyst can be re-calcined without taking out the catalytic structure from the reactor and leaving the catalytic structure fixed to the reactor, by performing re-calcination in the same manner as described above except that a muffle furnace is not used.

(Presence of Deterioration of Reaction Efficiency)

Deterioration of reaction efficiency was considered to be "present" when the carbonate ester yield became lower by 5 mol % or more as compared to that upon initial use, and deterioration of reaction efficiency was considered to be "absent" when the carbonate ester yield became lower by less than 5 mol %.

(Presence of Falling)

Falling of the catalyst is considered to be "present" when the weight of the catalytic structure after the reaction became lower by 0.2 g or more as compared to the weight before the reaction (about 8.80 g), and falling of the catalyst was considered to be "absent" when the weight of the catalytic structure after the reaction became lower by less than 0.2 g.

The presence of deterioration of reaction efficiency and presence of catalyst falling due to reaction and calcination were assessed in the same manner in the examples and the comparative examples described hereinbelow as well.

Examples 2-4

Catalytic structures according to Examples 2-4 were prepared in the same manner as Example 1 except that cerium oxide was applied by repeatedly immersing the metal honeycombs in a coating liquid containing cerium oxide powder for multiple times to attach cerium oxide for about 30 g/m², 70 g/m² and 150 g/m², respectively. The catalytic layers of the resulting structures were estimated to have film thicknesses of about 20 μm, about 50 μm and about 100 μm, respectively.

When the reaction was assessed using each catalytic structure, the catalytic structure having 30 g/m² of catalyst attached thereto according to Example 2 had a DPrC yield as high as 57 mol % and a by-products/DPrC ratio suppressed to 1.2 mol %. The catalytic structure of Example 3 having 70 g/m² of catalyst attached had a DPrC yield as high as 52 mol % and a by-products/DPrC ratio suppressed to 1.4 mol %. The catalytic structure of Example 4 having 150 g/m² of catalyst attached had a DPrC yield as high as 42 mol % and a by-products/DPrC ratio suppressed to 2.7 mol %. Furthermore, in all of the structures, cerium oxide powder did not fall off from the base material and had high adhesiveness even after the reaction. Furthermore, when each of the structure was repeatedly re-calcinated and used in the same manner as Example 1, the reaction performance hardly changed and the cerium oxide powder was confirmed that it did not fall off from the base material.

Example 5

The same cerium oxide powder as Example 1, a silica binder (Sumiceram, P-700-D (primarily a mixture of silica powder with an average particle size of about 5 μm, a siloxane-based binder and water) available from ASAHI Chemical Co., Ltd.) and water were weighed to give a weight ratio of 2:0.95:1.5 to prepare 50 g of a catalytic layer-forming mixture, which was used to fill a 50-cc beaker. The rest of the procedure was the same as Example 2, thereby preparing a catalytic structure having 30 g/m² of catalyst attached thereto according to Example 5. The film thickness of the catalytic layer in the case was estimated to be about 20 μm. The reaction using this structure was assessed and found that the DPrC yield was as high as 54 mol % while the by-products/DPrC ratio was suppressed to 0.9 mol %. In addition, cerium oxide powder did not fall off from the base material and had high adhesiveness even after the reaction.

Furthermore, when this structure was repeatedly re-calcinated and used in the same manner as Example 1, the reaction performance hardly changed and the cerium oxide powder was confirmed that it did not fall off from the base material. Specifically, after the above-described reactivity assessment, the catalytic structure of Example 5 was subjected to a regeneration treatment by calcining for 3 hours in air atmosphere at 573K and then subjected to the reaction assessment again. As a result, the DPrC yield was 54 mol % and the by-products/DPrC ratio was 0.9 mol %, which were the same as the initial assessments in Example 5. In addition, cerium oxide powder did not fall off from the base material and had high adhesiveness even after the reaction.

Examples 6 and 7

Catalytic structures according to Examples 6 and 7 were prepared in the same manner as Example 1 except that 200- and 300-cells-per-square-inch cylindrical metal honeycomb structures having a diameter of 19 mmφ and a length of 20 mm (steel type: YUS205M1, plate thickness: 50 μm, fin (corrugated foil) shape: sine wave, available from Nippon Steel and Sumikin Materials Co., Ltd.) were used as metal honeycomb base materials, respectively, and the amount of cerium oxide affixed was 30 g/m². The film thicknesses of the catalytic layers in these cases were both about 11 μm. When each of the structures was subjected to a reaction assessment, the 200-cells-per-square-inch catalytic structure of Example 6 had the DPrC yield as high as 58 mol % while the by-products/DPrC ratio was suppressed to 1.1 mol %. Meanwhile, the 300-cells-per-square-inch catalytic structure of Example 7 had the DPrC yield as high as 59 mol % while the by-products/DPrC ratio was suppressed to 1.0 mol %. Moreover, in both of the structures, cerium oxide powder did not fall off from the base materials and had high adhesiveness even after the reaction. Furthermore, when each of the structures was repeatedly re-calcined and used for multiple times in the same manner as Example 1, the reaction performance hardly changed and the cerium oxide powder was confirmed that it did not fall off from the base material.

Example 8

The same cerium oxide powder as Example 1, a silica binder (Sumiceram, P-700-D (primarily a mixture of silica powder with an average particle size of about 5 μm, a siloxane-based binder and water) available from ASAHI Chemical Co., Ltd.) and water were weighted to give a weight ratio of 2:0.95:1.5 to prepare 50 g of a catalytic layer-forming mixture, which was used to fill a 50-cc beaker. The rest of the procedure was the same as Example 2 except that a silica binder for forming an intermediate layer between the catalytic layer and the catalyst-coated base material was not applied in advance, thereby preparing a catalytic structure having 30 g/m$^2$ of catalyst attached thereto according to Example 8. The film thickness of the catalytic layer in the case was estimated to be about 20 μm. The reaction using this structure was assessed and found that the DPrC yield was as high as 54 mol % while the by-products/DPrC ratio was suppressed to 0.9 mol %. In addition, cerium oxide powder did not fall off from the base material and had high adhesiveness even after the reaction. While the reaction performance hardly changed when this structure was repeatedly re-calcined and used for multiple times in the same manner as Example 1, a part of the cerium oxide powder was confirmed to have fallen off from the base material but this degree of falling was acceptable.

Example 9

A catalyst component different from the above-described examples was used as follows.

Specifically, sodium hydroxide was introduced into a solution obtained by dissolving cerium nitrate and zirconium nitrate such that cerium was 20 at. wt % to allow precipitation. The precipitate was filtrated, washed with water and then calcined for 3 hours in air atmosphere at 1273K. Thereafter, sieves were used to distinguish the particle size to obtain cerium zirconium oxide powder having an average particle size of about 10 μm and an impurity concentration of 0.1% or less. The rest of the procedure was the same as Example 2, thereby preparing a catalytic structure having 30 g/m$^2$ of catalyst attached thereto. The film thickness of the catalytic layer in the case was estimated to be about 20 μm. The reaction using this structure was assessed and found that the DPrC yield was as high as 48 mol % while the by-products/DPrC ratio was suppressed to 0.8 mol %. The cerium zirconium oxide powder did not fall off from the base material and had high adhesiveness even after the reaction. When this structure was repeatedly re-calcined and used for multiple times in the same manner as Example 1, the reaction performance hardly changed and the cerium zirconium oxide powder was confirmed that it did not fall off from the base material.

Examples 10-14

Catalytic structures were produced in the same manner as Example 1. The catalytic structures produced were used and assessed in the same manner as Example 1 except that methanol, ethanol and n-butanol (primary alcohols), isopropanol a secondary alcohol, and tert-butyl alcohol (a tertiary alcohol) were used, respectively, instead of 1-propanol upon the reaction assessments. As a result, the yields of dimethyl carbonate, diethyl carbonate, dibutyl carbonate, diisopropyl carbonate and di-tert-butyl carbonate were 56 mol %, 55 mol %, 52 mol %, 48 mol % and 42 mol %, respectively, while the by-products/carbonate ester ratios were suppressed to 0.8 mol %, 0.9 mol %, 1.0 mol %, 1.4 mol % and 1.8 mol %, respectively. In all cases, the cerium oxide powder did not fall off from the base material and had high adhesiveness even after the reaction. Furthermore, when these structures were repeatedly re-calcined and used for multiple times in the same manner as Example 1 under the respective conditions, the reaction performance hardly changed and the cerium oxide powder was confirmed that it did not fall off from the base material.

Examples 15-17

The catalytic structure of Example 5 was used and subjected to reaction assessments in the same manner as Example 3 except that the reaction pressure was 2.0 MPa, 4.0 MPa and 8.0 MPa, respectively. As a result, the DPrC yields were as high as 55 mol %, 55 mol % and 54 mol %, respectively, while the by-products/DPrC ratios were suppressed to 0.7 mol %, 0.6 mol % and 0.5 mol %, respectively. In addition, cerium oxide powder did not fall off from the base material and had high adhesiveness even after the reaction. Furthermore, when these structures were repeatedly re-calcined and used for multiple times in the same manner as Example 1 under the respective conditions, the reaction performance hardly changed and the cerium oxide powder was confirmed that it did not fall off from the base material.

Example 18

Cerium oxide (HS, average particle size: about 5 μm, impurity concentration: 0.02% or less, available from Daiichi Kigenso Kagaku Kogyo Co., Ltd.) was calcined for 3 hours in air atmosphere at 873K to give a powdery solid catalyst. The resulting powder was used to prepare a catalytic structure in the same manner as Example 1 except that the amount of cerium oxide affixed was 200 g/m$^2$. The film thickness of the catalytic layer in this case was estimated to be about 140 μm. The reaction using this structure was assessed and found that the DPrC yield under this condition was 40 mol %. Meanwhile, the by-products/DPrC ratio was suppressed to 2.9 mol %. In addition, cerium oxide powder did not fall off from the base material and had high adhesiveness even after the reaction. Furthermore, when this structure was repeatedly re-calcinated and used in the same manner as Example 1, the reaction performance hardly changed and the cerium oxide powder was confirmed that it did not fall off from the base material.

Example 19

A catalytic structure was prepared and subjected to a reaction assessment in the same manner as Example 1 except that SUS304 was used as the honeycomb base material. As a result, the DPrC yield under this condition was 51 mol %. Meanwhile, the by-products/DPrC ratio was suppressed to 1.2 mol %. In addition, cerium oxide powder did not fall off from the base material and had high adhesiveness even after the reaction. Furthermore, when this structure was repeatedly re-calcinated and used in the same manner as Example 1, the reaction performance hardly changed and the cerium oxide powder was confirmed that it did not fall off from the base material.

Example 20

A catalytic structure was prepared and subjected to a reaction assessment in the same manner as Example 1 except that ceramic (a 400-cells-per-square-inch cylindrical shape, trade name: Honeyceram, available from NGK Insulators, Ltd.) was used as the honeycomb base material. As a result, the DPrC yield under this condition was 50 mol %. Meanwhile, the by-products/DPrC ratio was suppressed to 1.2 mol %. In addition, cerium oxide powder did not fall off from the base material and had high adhesiveness even after the reaction. Furthermore, when this structure was repeatedly re-calcinated and used in the same manner as Example 1, the reaction performance hardly changed and the cerium oxide powder was confirmed that it did not fall off from the base material.

Example 21

A catalytic structure was prepared and subjected to a reaction assessment in the same manner as Example 1 except that silica sol (available from JGC Catalyst and Chemicals Ltd.) was used as the inorganic binder. As a result, the DPrC yield under this condition was 54 mol %. Meanwhile, the by-products/DPrC ratio was suppressed to 1.1 mol %. In addition, cerium oxide powder did not fall off from the base material and had high adhesiveness even after the reaction. Furthermore, when this structure was repeatedly re-calcinated and used in the same manner as Example 1, the reaction performance hardly changed and the cerium oxide powder was confirmed that it did not fall off from the base material.

Example 22

A catalytic structure was prepared and subjected to a reaction assessment in the same manner as Example 1 except that alumina sol (available from Nissan Chemical Corporation) was used as the inorganic binder. As a result, the DPrC yield under this condition was 51 mol %. Meanwhile, the by-products/DPrC ratio was suppressed to 1.2 mol %. In addition, cerium oxide powder did not fall off from the base material and had high adhesiveness even after the reaction. Furthermore, when this structure was repeatedly re-calcinated and used in the same manner as Example 1, the reaction performance hardly changed and the cerium oxide powder was confirmed that it did not fall off from the base material.

Example 23

A catalytic structure was prepared and subjected to a reaction assessment in the same manner as Example 1 except that benzonitrile was used as the hydration agent. As a result, the DPrC yield under this condition was 40 mol %. Meanwhile, the by-products/DPrC ratio was suppressed to 2.8 mol %. In addition, cerium oxide powder did not fall off from the base material and had high adhesiveness even after the reaction. Furthermore, when this structure was repeatedly re-calcined and used for multiple times in the same manner as Example 1 under this condition, the reaction performance hardly changed and the cerium oxide powder was confirmed that it did not fall off from the base material.

Comparative Example 1

A catalytic structure was prepared and subjected to a reaction assessment in the same manner as Example 1 except that the blowing pressure of nitrogen gas after applying the cerium oxide powder was increased such that the final amount of cerium oxide affixed was 8 g/m$^2$. The film thickness of the catalytic layer of the resulting structure was estimated to be about 6 µm. The reaction using this structure was assessed and found that the DPrC yield under this condition was as low as 30 mol %. Meanwhile, the by-products/DPrC ratio increased as high as 3.6 mol %. The cerium oxide powder did not fall off from the base material and had high adhesiveness after the reaction.

Comparative Example 2

A catalytic structure was prepared and subjected to a reaction assessment in the same manner as Example 1 except that the amount of cerium oxide affixed was 250 g/m$^2$.

The film thickness of the catalytic layer of the resulting structure was estimated to be about 180 µm. The reaction using this structure was assessed and found that the DPrC yield under this condition was as low as 22 mol %. Meanwhile, the by-products/DPrC ratio increased as high as 4.5 mol %. The cerium oxide powder has partially fallen off from the base material and adhesiveness was insufficient after the reaction.

The above-described results are shown collectively in Tables 1-4.

In each table: "Metal honeycomb 1" refers to a 100-cells-per-square-inch cylindrical metal honeycomb (steel type: YUS205M1, plate thickness: 50 µm, fin (corrugated foil) shape: sine wave, available from Nippon Steel and Sumikin Materials Co., Ltd.); "Metal honeycomb 2" refers to a 200-cells-per-square-inch cylindrical metal honeycomb (steel type: YUS205M1, plate thickness: 50 µm, fin (corrugated foil) shape: sine wave, available from Nippon Steel and Sumikin Materials Co., Ltd.); "Metal honeycomb 3" refers to a 300-cells-per-square-inch cylindrical metal honeycomb (steel type: YUS205M1, plate thickness: 50 µm, fin (corrugated foil) shape: sine wave, available from Nippon Steel and Sumikin Materials Co., Ltd.); "Metal honeycomb 4" refers to a 100-cells-per-square-inch cylindrical metal honeycomb (steel type: SUS304, plate thickness: 50 µm, fin (corrugated foil) shape: sine wave, available from Nippon Steel and Sumikin Materials Co., Ltd.); and "Ceramic honeycomb" refers to a 400-cells-per-square-inch cylindrical shape ceramic honeycomb (trade name: Honeyceram, available from NGK Insulators, Ltd.).

Furthermore, in each table: "Silica 1" refers to silica derived from Sumiceram, P-750 (available from ASAHI Chemical Co., Ltd.); "Silica 2" refers to silica derived from Sumiceram, P-700-D (available from ASAHI Chemical Co., Ltd.); "Silica 3" refers to silica derived from silica sol (available from JGC Catalyst and Chemicals Ltd.); and "Alumina" refers to alumina derived from alumina sol (available from Nissan Chemical Corporation).

[Table 1]

TABLE 1

|  |  |  | Example 1 | Example 2 | Example 3 | Example 4 | Example 5 | Example 6 | Example 7 |
|---|---|---|---|---|---|---|---|---|---|
| Catalytic structure | Base material | Kind | Metal honeycomb 1 | Metal honeycomb 1 | Metal honeycomb 1 | Metal honeycomb 1 | Metal honeycomb 1 | Metal honeycomb 2 | Metal honeycomb 3 |
|  |  | Shape | Fin | Fin | Fin | Fin | Fin | Fin | Fin |
|  |  | Cell number (Cells/inch$^2$) | 100 | 100 | 100 | 100 | 100 | 200 | 300 |
|  | Catalytic layer | Solid catalyst Kind | $CeO_2$ | $CeO_2$ | $CeO_2$ | $CeO_2$ | $CeO_2$ | $CeO_2$ | $CeO_2$ |
|  |  | Average particle size (mm) | 10 | 10 | 10 | 10 | 10 | 10 | 10 |
|  |  | Supported amount (g/m$^2$) | 15 | 30 | 70 | 150 | 30 | 30 | 30 |
|  |  | Kind of inorganic binder | Silica 1 | Silica 1 | Silica 1 | Silica 1 | Silica 2 | Silica 1 | Silica 1 |
|  | Presence of intermediate layer |  | Present | Present | Present | Present | Present | Present | Present |
| Reaction conditions | Monohydric alcohol |  | 1-Propanol | 1-Propanol | 1-Propanol | 1-Propanol | 1-Propanol | 1-Propanol | 1-Propanol |
|  | Hydration agent |  | 2-Cyano-pyridine | 2-Cyano-pyridine | 2-Cyano-pyridine | 2-Cyano-pyridine | 2-Cyano-pyridine | 2-Cyano-pyridine | 2-Cyano-pyridine |
|  | Reaction pressure (Mpa) |  | 1.0 | 1.0 | 1.0 | 1.0 | 1.0 | 1.0 | 1.0 |
| Assessments | Yield of carbonate ester (mol %) |  | 55 | 57 | 52 | 42 | 54 | 58 | 59 |
|  | By-products/carbonate ester ratio (mol %) |  | 1.0 | 1.2 | 1.4 | 2.7 | 0.9 | 1.1 | 1.0 |
|  | Yield of carbonate ester after re-calcination of catalyst |  | 55 | 57 | 51 | 42 | 53 | 58 | 59 |
|  | Deterioration of reaction efficiency due to two or more times of use (repeated use following re-calcination of catalyst) |  | Absent | Absent | Absent | Absent | Absent | Absent | Absent |
|  | Difference in weights of catalyst structure before and after reaction/calcination (g) |  | 0.0 | 0.0 | 0.0 | 0.0 | 0.0 | 0.0 | 0.0 |
|  | Presence of falling |  | Absent | Absent | Absent | Absent | Absent | Absent | Absent |
|  | Thickness of catalyst (μm) |  | 15 | 20 | 50 | 100 | 20 | 20 | 20 |

[Table 2]

TABLE 2

|  |  |  |  | Example 8 | Example 9 | Example 10 | Example 11 | Example 12 | Example 13 | Example 14 |
|---|---|---|---|---|---|---|---|---|---|---|
| Catalytic structure | Base material | Kind |  | Metal honeycomb 1 | Metal honeycomb 1 | Metal honeycomb 1 | Metal honeycomb 1 | Metal honeycomb 1 | Metal honeycomb 1 | Metal honeycomb 1 |
|  |  | Shape |  | Fin | Fin | Fin | Fin | Fin | Fin | Fin |
|  |  | Cell number (cells/inch$^2$) |  | 100 | 100 | 100 | 100 | 100 | 100 | 100 |
|  | Catalytic layer | Solid catalyst | Kind | $CeO_2$ | $CeO_2$, $ZrO_2$ | $CeO_2$ | $CeO_2$ | $CeO_2$ | $CeO_2$ | $CeO_2$ |
|  |  |  | Average particle size (mm) | 10 | 10 | 10 | 10 | 10 | 10 | 10 |
|  |  |  | Supported amount (g/m$^2$) | 30 | 30 | 15 | 15 | 15 | 15 | 15 |
|  |  | Kind of inorganic binder |  | Silica 2 | Silica 1 | Silica 1 | Silica 1 | Silica 1 | Silica 1 | Silica 1 |
|  | Presence of intermediate layer |  |  | Absent | Present | Present | Present | Present | Present | Present |
| Reaction conditions | Monohydric alcohol |  |  | 1-Propanol | 1-Propanol | Methanol | Ethanol | n-Butanol | Iso-propanol | tert-Butyl alcohol |
|  | Hydration agent |  |  | 2-Cyano-pyridine | 2-Cyano-pyridine | 2-Cyano-pyridine | 2-Cyano-pyridine | 2-Cyano-pyridine | 2-Cyano-pyridine | 2-Cyano-pyridine |
|  | Reaction pressure (Mpa) |  |  | 1.0 | 1.0 | 1.0 | 1.0 | 1.0 | 1.0 | 1.0 |
| Assessments | Yield of carbonate ester (mol %) |  |  | 54 | 48 | 56 | 55 | 52 | 48 | 42 |
|  | By-products/carbonate ester ratio (mol %) |  |  | 0.9 | 0.8 | 0.8 | 0.9 | 1.0 | 1.4 | 1.8 |

TABLE 2-continued

|  | Example 8 | Example 9 | Example 10 | Example 11 | Example 12 | Example 13 | Example 14 |
|---|---|---|---|---|---|---|---|
| Yield of carbonate ester after re-calcination of catalyst (mol %) | 54 | 49 | 56 | 55 | 51 | 48 | 41 |
| Deterioration of reaction efficiency due to two or more times of use (repeated use following re-calcination of catalyst) | Absent | Absent | Absent | Absent | Absent | Absent | Absent |
| Difference in weights of catalyst structure before and after reaction/calcination (g) | 0.2 | 0.0 | 0.0 | 0.0 | 0.0 | 0.0 | 0.0 |
| Presence of falling | Slightly present | Absent | Absent | Absent | Absent | Absent | Absent |
| Thickness of catalyst (μm) | 20 | 20 | 15 | 15 | 15 | 15 | 15 |

[Table 3]

TABLE 3

| | | | | Example 15 | Example 16 | Example 17 | Example 18 | Example 19 | Example 20 | Example 21 |
|---|---|---|---|---|---|---|---|---|---|---|
| Catalytic structure | Base material | Kind | | Metal honeycomb 1 | Metal honeycomb 1 | Metal honeycomb 1 | Metal honeycomb 1 | Metal honeycomb 4 | Ceramic honeycomb | Metal honeycomb 1 |
| | | Shape | | Fin | Fin | Fin | Fin | Fin | | Fin |
| | | Cell number (cells/inch$^2$) | | 100 | 100 | 100 | 100 | 100 | 400 | 100 |
| | Catalytic layer | Solid catalyst | Kind | $CeO_2$ | $CeO_2$ | $CeO_2$ | $CeO_2$ | $CeO_2$ | $CeO_2$ | $CeO_2$ |
| | | | Average particle size (mm) | 10 | 10 | 10 | 5 | 10 | 10 | 10 |
| | | | Supported amount (g/m$^2$) | 30 | 30 | 30 | 200 | 15 | 15 | 15 |
| | | Kind of inorganic binder | | Silica 2 | Silica 2 | Silica 2 | Silica 1 | Silica 1 | Silica 1 | Silica 3 |
| | Presence of intermediate layer | | | Present | Present | Present | Present | Present | Present | Present |
| Reaction conditions | Monohydric alcohol | | | 1-Propanol | 1-Propanol | 1-Propanol | 1-Propanol | 1-Propanol | 1-Propanol | 1-Propanol |
| | Hydration agent | | | 2-Cyanopyridine | 2-Cyanopyridine | 2-Cyanopyridine | 2-Cyanopyridine | 2-Cyanopyridine | 2-Cyanopyridine | 2-Cyanopyridine |
| | Reaction pressure (Mpa) | | | 2.0 | 4.0 | 8.0 | 1.0 | 1.0 | 1.0 | 1.0 |
| Assessments | Yield of carbonate ester (mol %) | | | 55 | 55 | 54 | 40 | 51 | 50 | 54 |
| | By-products/carbonate ester ratio (mol %) | | | 0.7 | 0.6 | 0.5 | 2.9 | 1.2 | 1.2 | 1.1 |
| | Yield of carbonate ester after re-calcination of catalyst (mol %) | | | 54 | 55 | 54 | 39 | 51 | 50 | 53 |
| | Deterioration of reaction efficiency due to two or more times of use (repeated use following re-calcination of catalyst) | | | Absent | Absent | Absent | Absent | Absent | Absent | Absent |
| | Difference in weights of catalyst structure before and after reaction/calcination (g) | | | 0.0 | 0.0 | 0.0 | 0.0 | 0.0 | 0.0 | 0.0 |
| | Presence of falling | | | Absent | Absent | Absent | Absent | Absent | Absent | Absent |
| | Thickness of catalyst (μm) | | | 20 | 20 | 20 | 150 | 15 | 15 | 15 |

[Table 4]

TABLE 4

| | | | Example 22 | Example 23 | Comparative example 1 | Comparative example 2 |
|---|---|---|---|---|---|---|
| Catalytic structure | Base material | Kind | Metal honeycomb 1 | Metal honeycomb 1 | Metal honeycomb 1 | Metal honeycomb 1 |
| | | Shape | Fin | Fin | Fin | Fin |
| | | Cell number (cells/inch$^2$) | 100 | 100 | 100 | 100 |

TABLE 4-continued

|  |  |  |  | Example 22 | Example 23 | Comparative example 1 | Comparative example 2 |
|---|---|---|---|---|---|---|---|
|  | Catalytic layer | Solid catalyst | Kind | $CeO_2$ | $CeO_2$ | $CeO_2$ | $CeO_2$ |
|  |  |  | Average particle size (mm) | 10 | 10 | 10 | 10 |
|  |  |  | Supported amount (g/m²) | 15 | 15 | 8 | 250 |
|  |  | Kind of inorganic binder |  | Alumina | Silica 1 | Silica 1 | Silica 1 |
|  | Presence of intermediate layer |  |  | Present | Present | Present | Present |
| Reaction conditions | Monohydric alcohol |  |  | 1-Propanol | 1-Propanol | 1-Propanol | 1-Propanol |
|  | Hydration agent |  |  | 2-Cyano-pyridine | Benzo-nitrile | 2-Cyano-pyridine | 2-Cyano-pyridine |
|  | Reaction pressure (Mpa) |  |  | 1.0 | 1.0 | 1.0 | 1.0 |
| Assessments | Yield of carbonate ester (mol %) |  |  | 51 | 40 | 30 | 22 |
|  | By-products/carbonate ester ratio (mol %) |  |  | 1.2 | 2.8 | 3.6 | 4.5 |
|  | Yield of carbonate ester after re-calcination of catalyst (mol %) |  |  | 50 | 40 | 31 | 15 |
|  | Deterioration of reaction efficiency due to two or more times of use (repeated use following re-calcination of catalyst) |  |  | Absent | Absent | Absent | Present |
|  | Difference in weights of catalyst structure before and after reaction/calcination (g) |  |  | 0.0 | 0.0 | 0.0 | 0.7 |
|  | Presence of falling |  |  | Absent | Absent | Absent | Present |
|  | Thickness of catalyst (μm) |  |  | 15 | 15 | 10 | 200 |

Thus, carbonate esters were produced in good yield and generation of by-products was suppressed in Examples 1-23. Furthermore, the catalytic structures of Examples 1-23 were capable of suppressing deterioration of reaction efficiency (catalytic activity) and separation of the solid catalyst even after repeated use.

On the other hand, in Comparative examples 1 and 2, the yields of the carbonate esters were low because the amount of the supported solid catalyst was either too large or too small and the amount of by-products generated was large. Furthermore, in Comparative example 2 where a large amount of solid catalyst was supported, deterioration of reaction efficiency was observed due to falling and separation of the solid catalyst.

Moreover, when the solid catalyst was subjected to reaction in the same manner as Example 1 but without being supported by the base material, the powdery solid catalyst was further pulverized and caused filter clogging, which hindered further operation.

Example 24

The catalytic structure having 30 g/m² of cerium oxide attached thereto according to Example 2 was used to conduct assessments by subjecting it to continuous flow reaction. A buffer tank prepared was filled with 445 g of a solution having the same composition as that used for the reaction. The reaction solution was sent from this tank to the reactor at a rate of 111 g/h while the same amount of solution was taken out from the reactor. Here, the retention time of the reaction solution in the reactor was 240 minutes, which was ⅔ the time in the cases of Examples 1-7.

As a result, the DPrC yields after 6, 12, 18 and 22 hours of reaction were generally about 29 mol %. The by-product/DPrC ratios at these time points were 0.8 mol %, 1.0 mol %, 1.0 mol % and 1.0 mol %, respectively, confirming saturated and stable conditions. In addition, cerium oxide powder did not fall off from the base material and had high adhesiveness even after the reaction. Furthermore, when this structure was repeatedly used for a few times, the reaction performance hardly changed and the cerium oxide powder was confirmed that it did not fall off from the base material. Hence, the catalytic structure according to the present invention was also found to be applicable to a continuous reactor adopting a high raw material flow rate.

Example 25

A catalyst component different from those of the above-described examples was prepared as follows.

First, lanthanum oxide ($LaO_3 \cdot 6H_2O$) as a catalyst precursor was dissolved in 2 g of ultrapure water in a 20-mL sample bottle.

Meanwhile, 2.5 g of $CeO_2$ that had already been calcined at 600° C. for 3 hours was placed in a 50-mL glass beaker. The solution containing the precursor was homogeneously added to $CeO_2$ in the beaker and the resultant was stirred with a glass rod. The beaker was placed on a hot stirrer which was set to a temperature of about 80° C. in advance, and the solution in the beaker was stirred with the glass rod. Stirring with the glass rod was further continued while keeping the metal components homogeneous until the water was evaporated.

Furthermore, 2 g of ultrapure water was placed in the sample bottle that previously contained the precursor solution to rinse the bottle and the resultant was added to the beaker containing $CeO_2$. Thereafter, stirring with the glass rod for evaporating the water and the subsequent procedures of rinsing and so on were repeated once more in the same manner. Then, the resultant was dried on the hot stirrer for about 2 hours to completely evaporate the water in the beaker.

The components of the catalyst precursor in the beaker was transferred to a crucible and calcined in a muffle furnace. The calcination program was set such that the temperature was increased at a rate of 2° C./min to carry out calcination at 400° C. for 4 hours.

The resulting catalyst of Example 25 and a catalyst for comparison as a reference example that was prepared in the same manner as the method of Example 25 described above but did not contain lanthanum oxide, were used for generating carbonate esters under the same conditions below.
(Conditions of Carbonate Ester-Generating Reaction)
Feed mole ratio: (PrOH)/(2-CP)/(Catalyst ($CeO_2$+$LaO_3$ or $CeO_2$))=300/50/1
Catalyst: Sample affixed to foil (about 150 g/m$^2$)
Amount of reaction solution: 325 g
Amount of solution fed/discharged: 162.5 g/h
Retention time: 2h
Reaction pressure: 0.9 MPa
Reaction temperature: 132° C.

These results are shown in FIG. 3. As can be appreciated from the graph shown in FIG. 3, the catalyst of Example 25 was confirmed to maintain high catalytic activity for a long period of time by adjusting the components of the catalyst without performing a regeneration treatment such as the re-calcination described in Example 1. Specifically, as can be appreciated from the graph shown FIG. 3, when the catalyst for comparison as the reference example was used, the yield of the carbonate ester was high immediately after the start of the reaction but the activity was found to decrease. On the other hand, when the catalyst of Example 25 was used, superior catalytic activity was maintained without substantial deterioration even after 50 hours of reaction.

While preferred embodiments of the present invention have been described in detail, the present invention is not limited to these embodiments. A person having ordinary skill in the art to which the present invention pertains would obviously conceive of various alterations and modifications within the scope of the technical ideas defined by the claims, and such alterations and modifications should be construed as being duly within the technical scope of the present invention.

DESCRIPTION OF REFERENCE NUMERALS

1, 1A Catalytic structure for producing carbonate ester
10 Base material
20 Catalytic layer
30 Intermediate layer
40 Solid catalyst
50 Inorganic binder
60 Device for producing carbonate ester
100 Carbonate ester-producing equipment

The invention claimed is:

1. A method for producing a carbonate ester, comprising allowing a monohydric alcohol and carbon dioxide to react with each other in the presence of a catalytic structure and a hydration agent to produce a carbonate ester, wherein:
    the catalytic structure comprises a base material, and a catalytic layer which is formed on at least a part of the surface of the base material and which contains a solid catalyst and an inorganic binder;
    the solid catalyst contains cerium oxide;
    the amount of the supported solid catalyst is 15 g/m$^2$ to 200 g/m$^2$; and
    the inorganic binder contains silica and/or alumina;
    wherein the catalytic structure further comprises an intermediate layer consisting of the inorganic binder, formed between the catalytic layer and the base material,
    wherein the average thickness of the catalytic layer is 12 μm-180 μm.

2. The method for producing a carbonate ester according to claim 1, wherein the inorganic binder contains silica.

3. The method for producing a carbonate ester according to claim 1, wherein the amount of the supported solid catalyst is 15 g/m$^2$ to 150 g/m$^2$.

4. The method for producing a carbonate ester according to claim 1, wherein the amount of the supported solid catalyst is 15 g/m$^2$ to 70 g/m$^2$.

5. The method for producing a carbonate ester according to claim 1, wherein the base material has through-holes that serve as flow paths for the monohydric alcohol and carbon dioxide, and
    the catalytic layer is formed on the surface of the through-holes.

6. The method for producing a carbonate ester according to claim 1, wherein the solid catalyst further contains an oxide of a rare-earth element.

7. The method for producing a carbonate ester according to claim 6, wherein the solid catalyst contains lanthanum oxide.

8. The method for producing a carbonate ester according to claim 1, wherein the base material is a metal honeycomb.

9. The method for producing a carbonate ester according to claim 1, wherein the hydration agent contains a nitrile compound.

10. The method for producing a carbonate ester according to claim 1, wherein the hydration agent contains 2-cyanopyridine.

* * * * *